United States Patent
Sugita

(10) Patent No.: US 10,254,508 B2
(45) Date of Patent: Apr. 9, 2019

(54) CONVERTER DEVICE AND IMAGE CAPTURING APPARATUS

(71) Applicant: CANON KABUSHIKI KAISHA, Tokyo (JP)

(72) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 15/360,740

(22) Filed: Nov. 23, 2016

(65) Prior Publication Data

US 2017/0153414 A1    Jun. 1, 2017

(30) Foreign Application Priority Data

Nov. 30, 2015    (JP) ................... 2015-234311

(51) Int. Cl.
| | |
|---|---|
| G02B 7/14 | (2006.01) |
| G02B 15/10 | (2006.01) |
| G02B 15/08 | (2006.01) |
| H04N 5/225 | (2006.01) |
| H04N 5/232 | (2006.01) |

(52) U.S. Cl.
CPC .............. *G02B 7/14* (2013.01); *G02B 15/08* (2013.01); *G02B 15/10* (2013.01); *H04N 5/2254* (2013.01); *H04N 5/23296* (2013.01)

(58) Field of Classification Search
CPC ................ G02B 7/14; G02B 15/02–15/12
USPC .................................... 359/675, 672
See application file for complete search history.

(56) References Cited

U.S. PATENT DOCUMENTS

| | | | | |
|---|---|---|---|---|
| 6,556,354 B1 * | 4/2003 | Jourjon | ........... | G02B 15/10 359/672 |
| 2004/0196570 A1 | 10/2004 | Nurishi | | |

FOREIGN PATENT DOCUMENTS

| | | |
|---|---|---|
| CN | 102033303 A | 4/2011 |
| EP | 2312341 A2 | 4/2011 |
| JP | 2002-131637 A | 5/2002 |
| JP | 2004-046022 A | 2/2004 |
| JP | 2004-309895 A | 11/2004 |
| JP | 2008-139404 A | 6/2008 |
| JP | 2015-102734 A | 6/2015 |

* cited by examiner

*Primary Examiner* — Kristina M DeHerrera
(74) *Attorney, Agent, or Firm* — Canon U.S.A. Inc., IP Division

(57) ABSTRACT

In a converter device that is attached between a lens device, which is attachable to and detachable from an image capturing apparatus, and the image capturing apparatus, and that has a reimaging optical system configured to reimage a primary image formed by the lens device on an image plane as a secondary image, the imaging magnification of the reimaging optical system and imaging positions of a primary image and a secondary image are appropriately set.

12 Claims, 29 Drawing Sheets

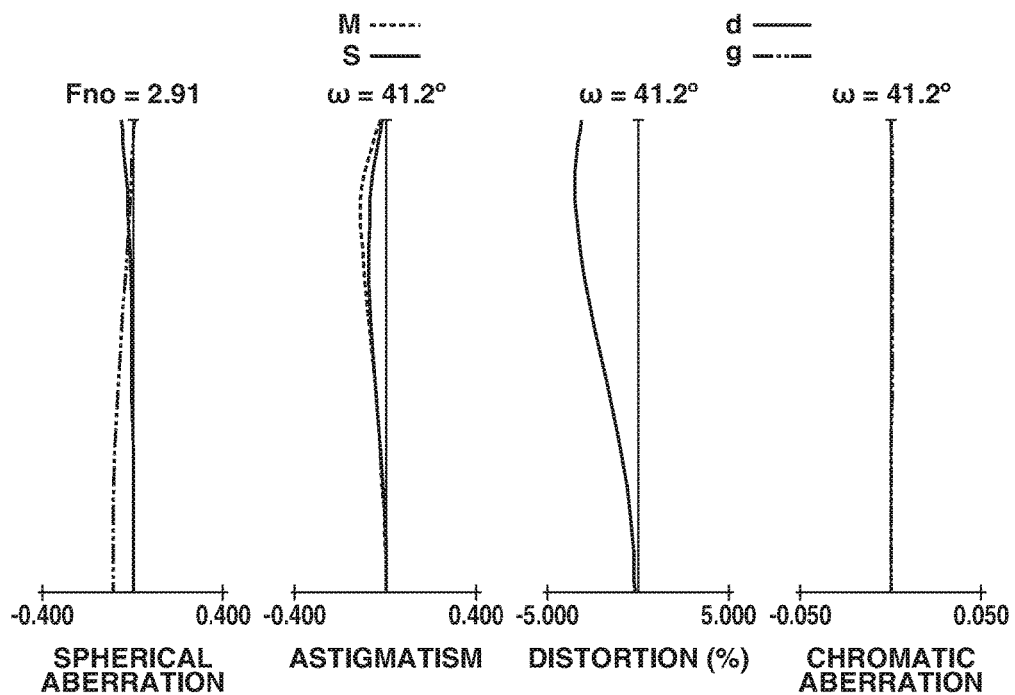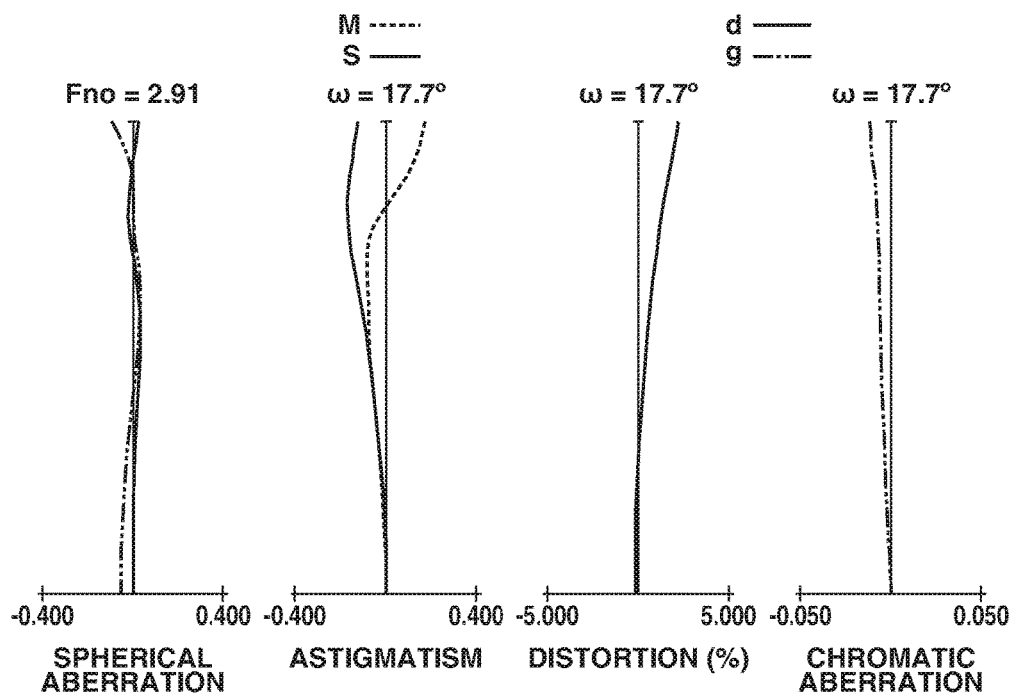

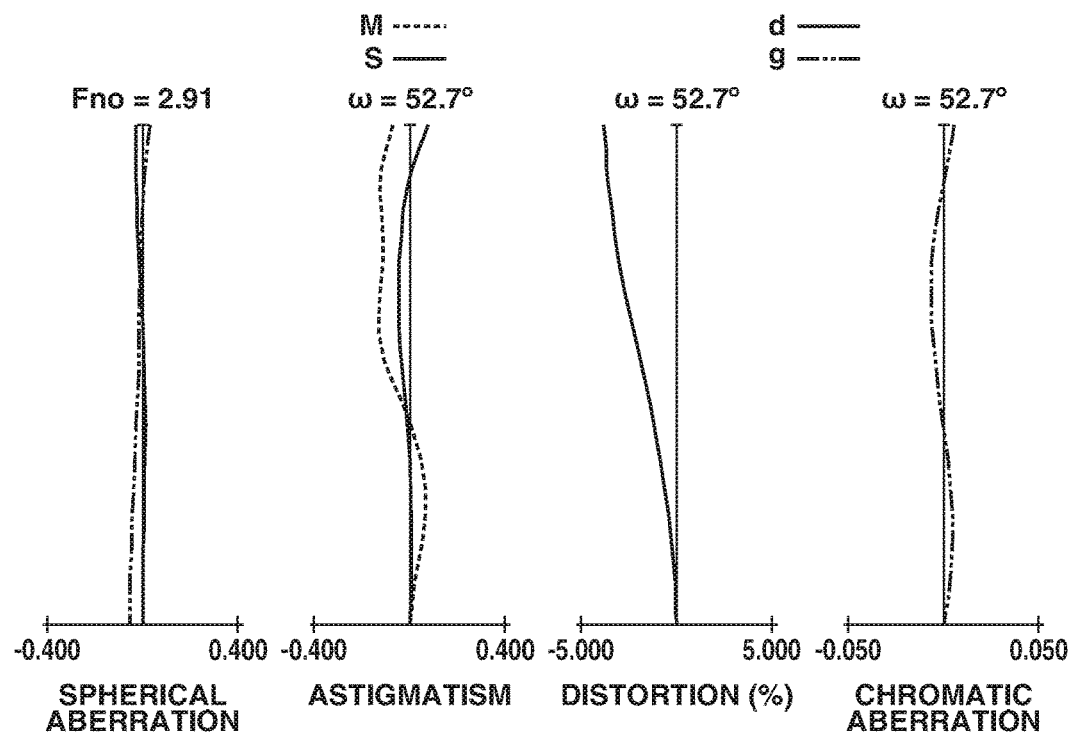
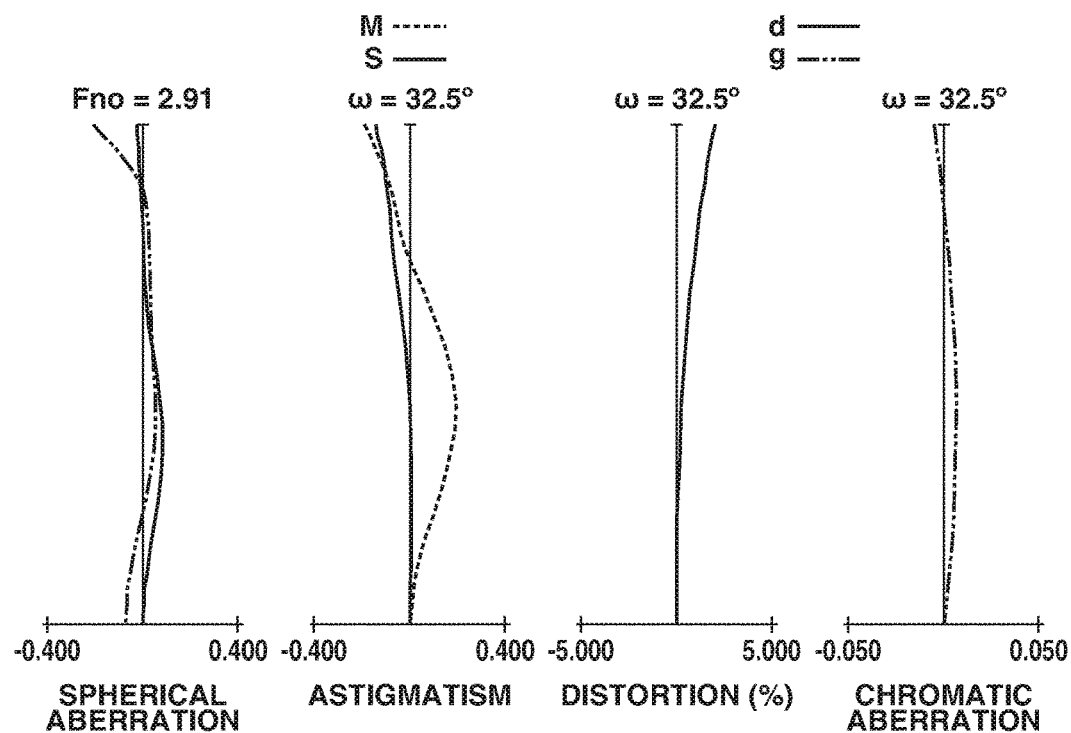

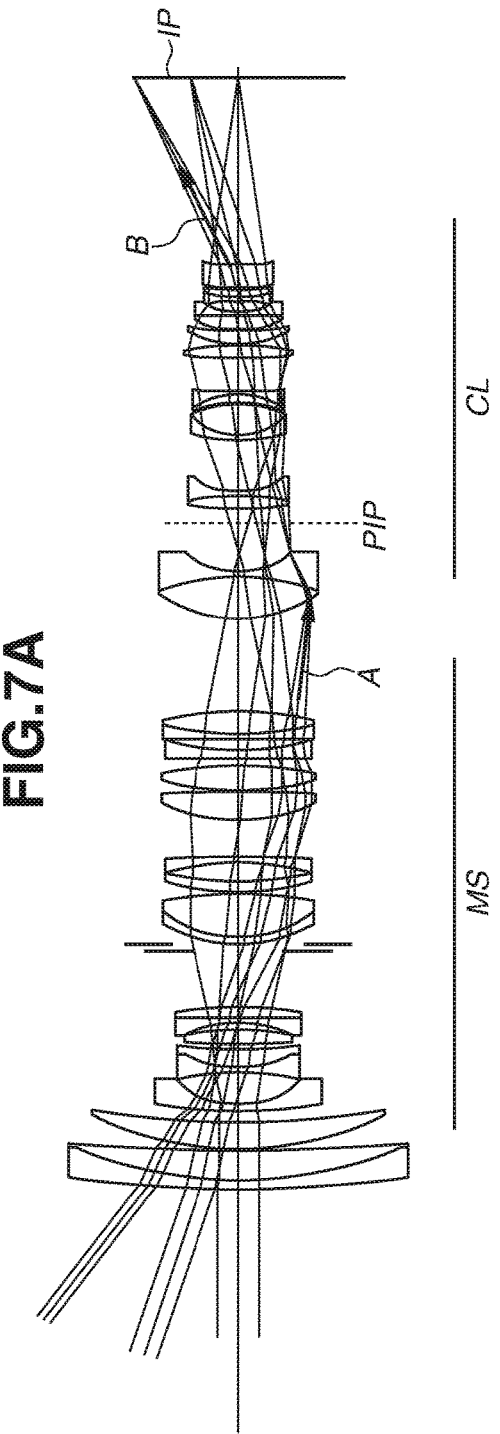
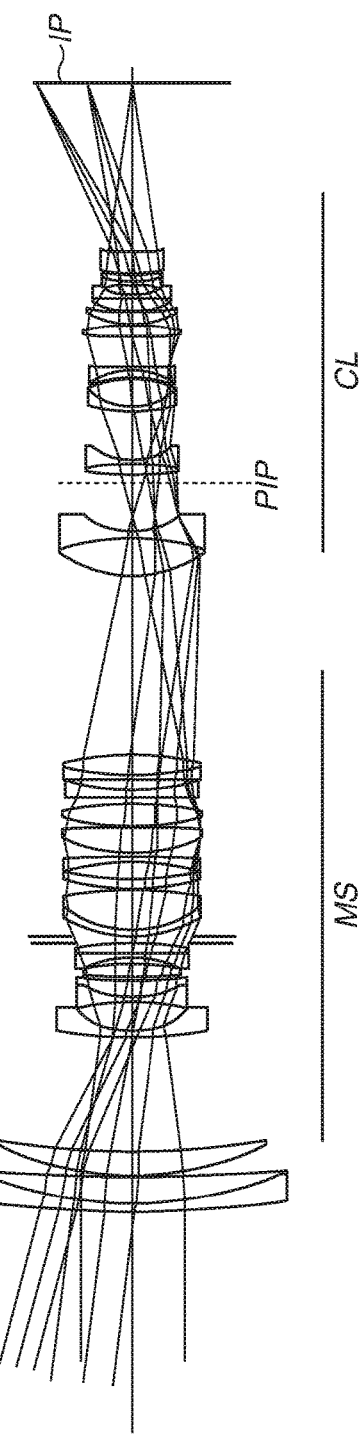

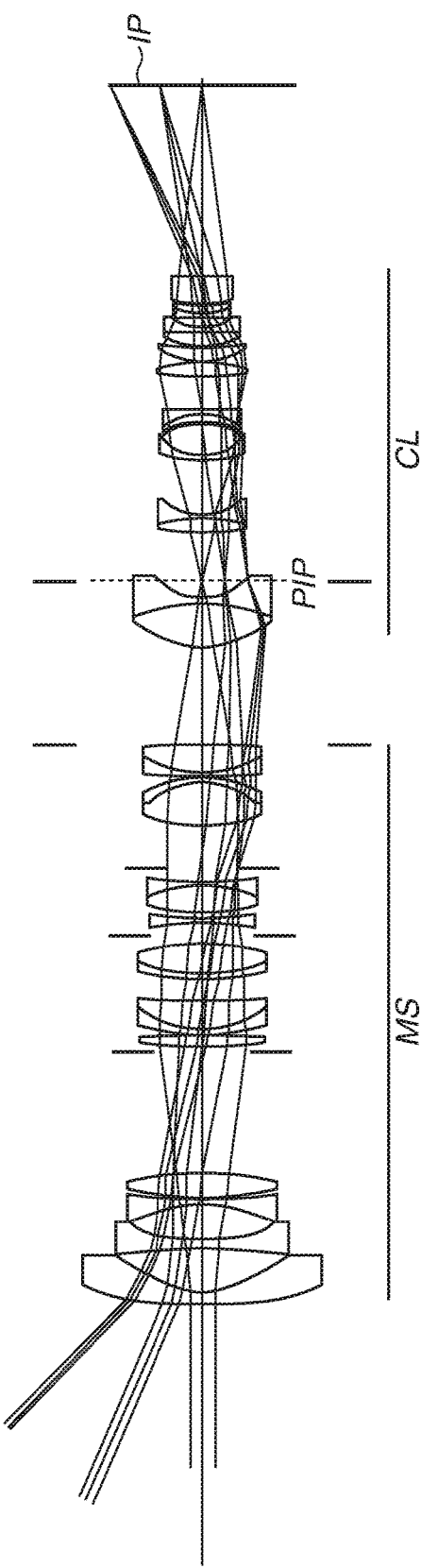
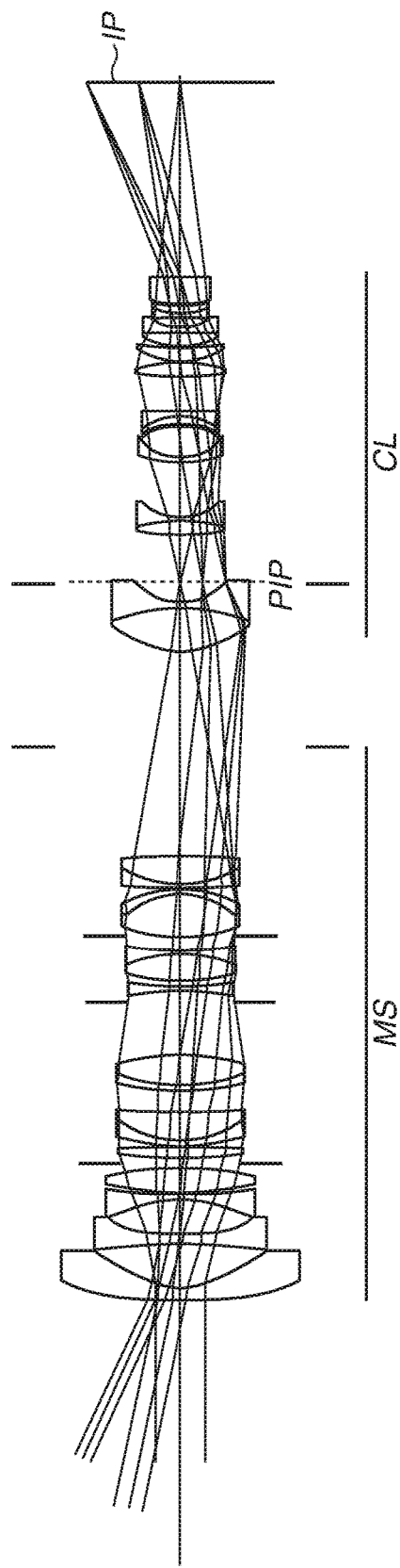
FIG.9A
FIG.9B

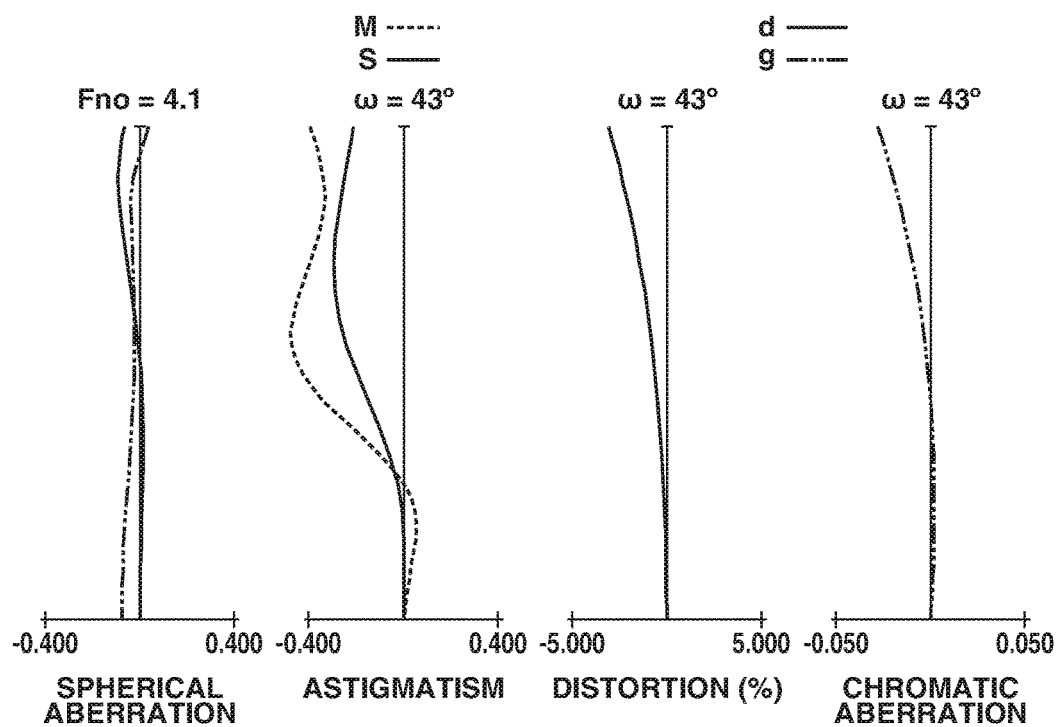
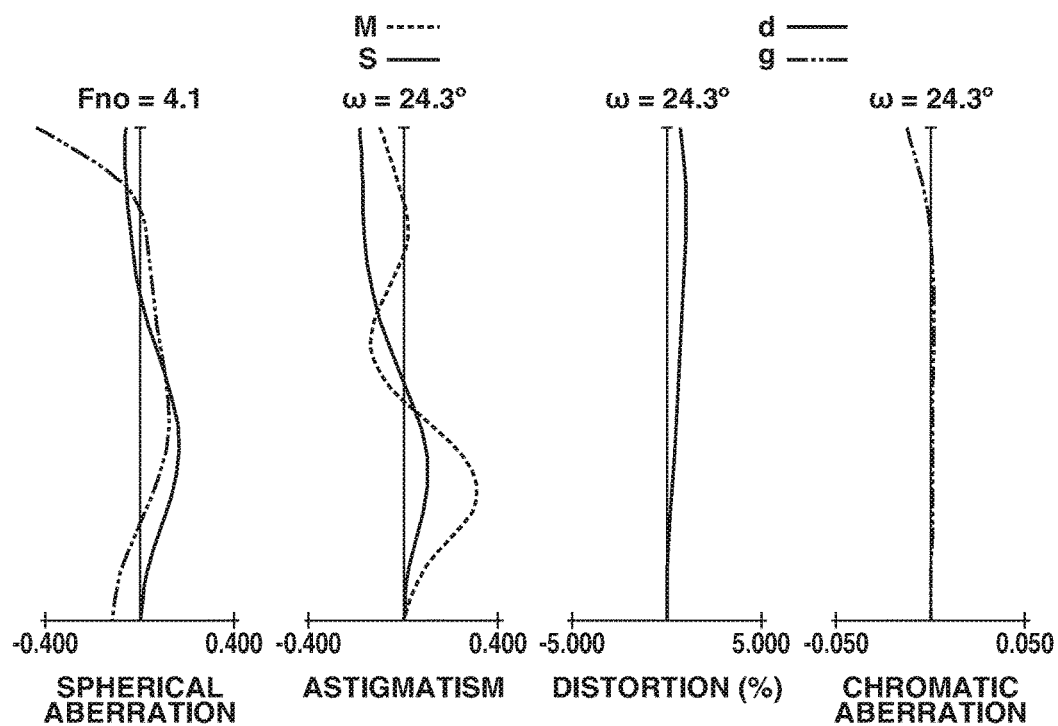

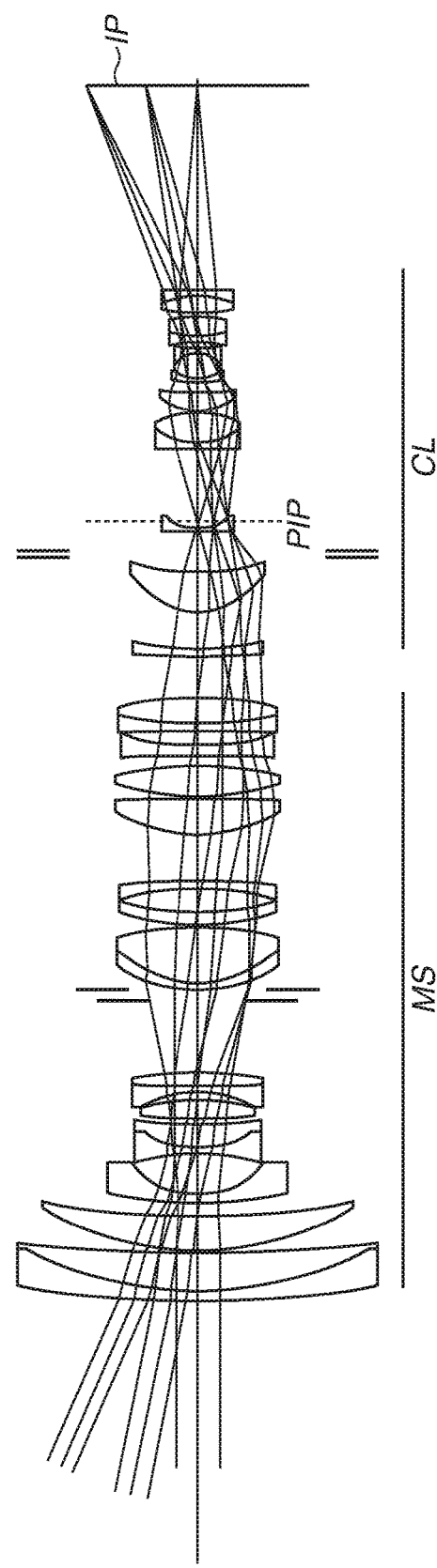
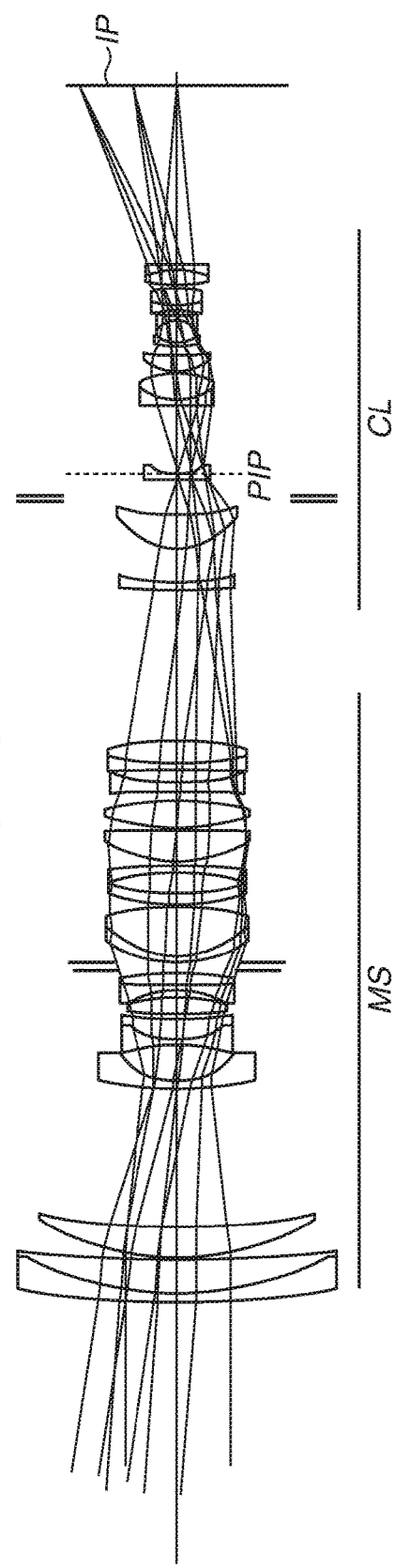
FIG.13A
FIG.13B

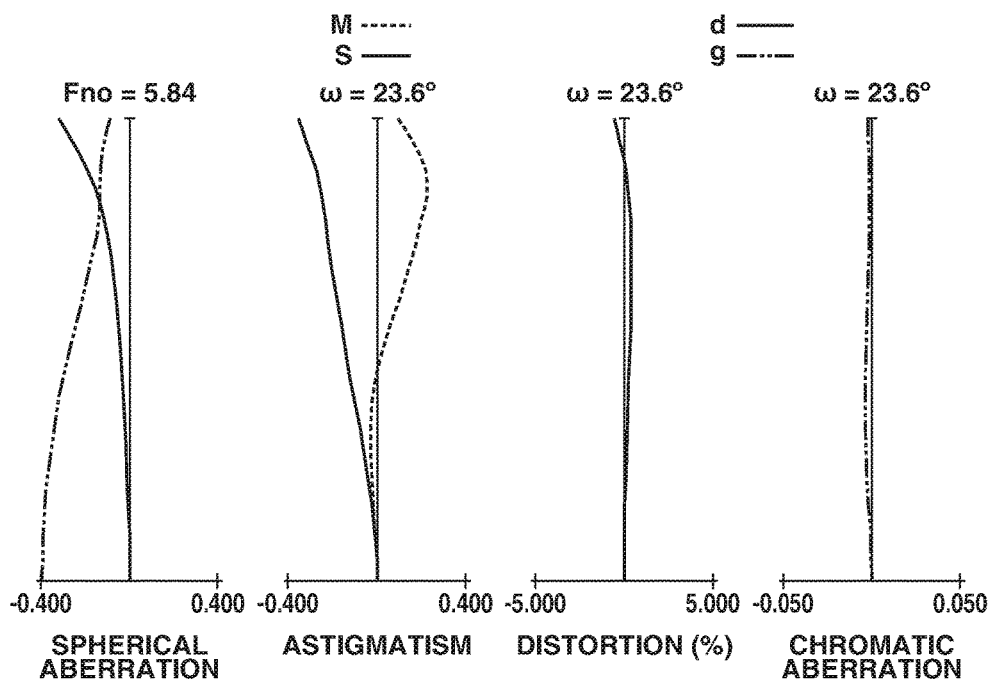
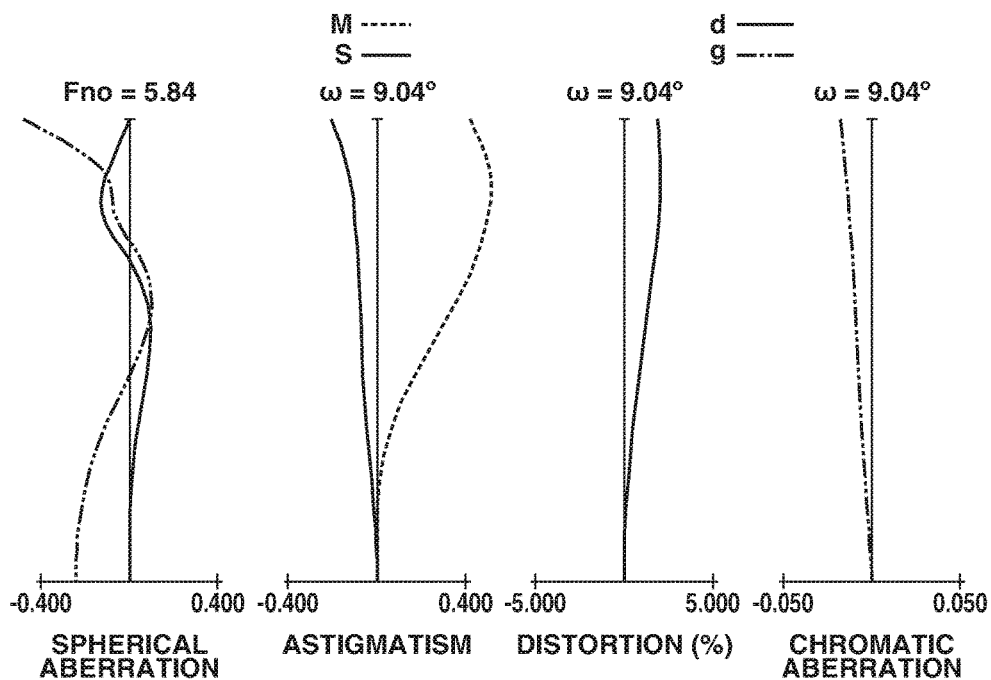

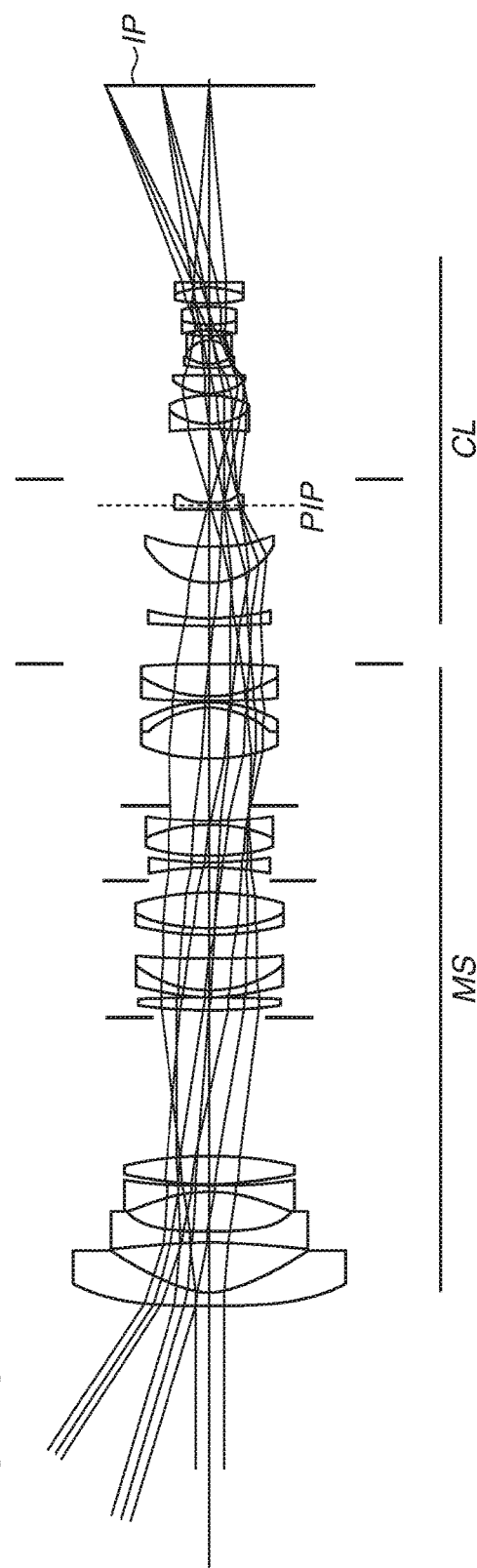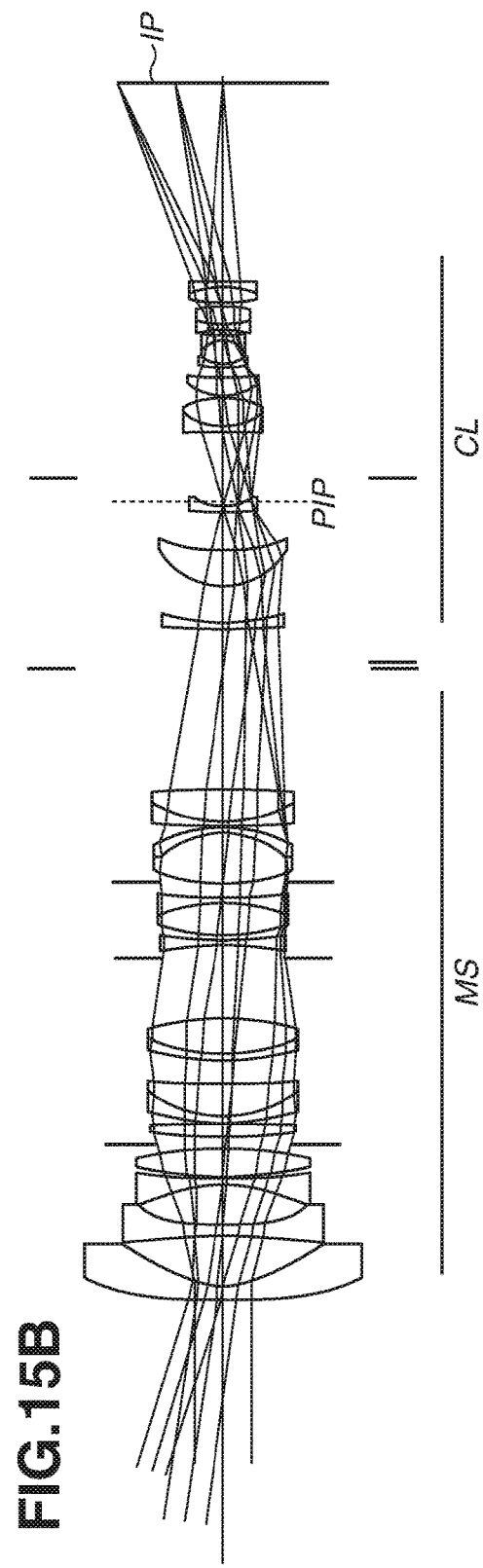

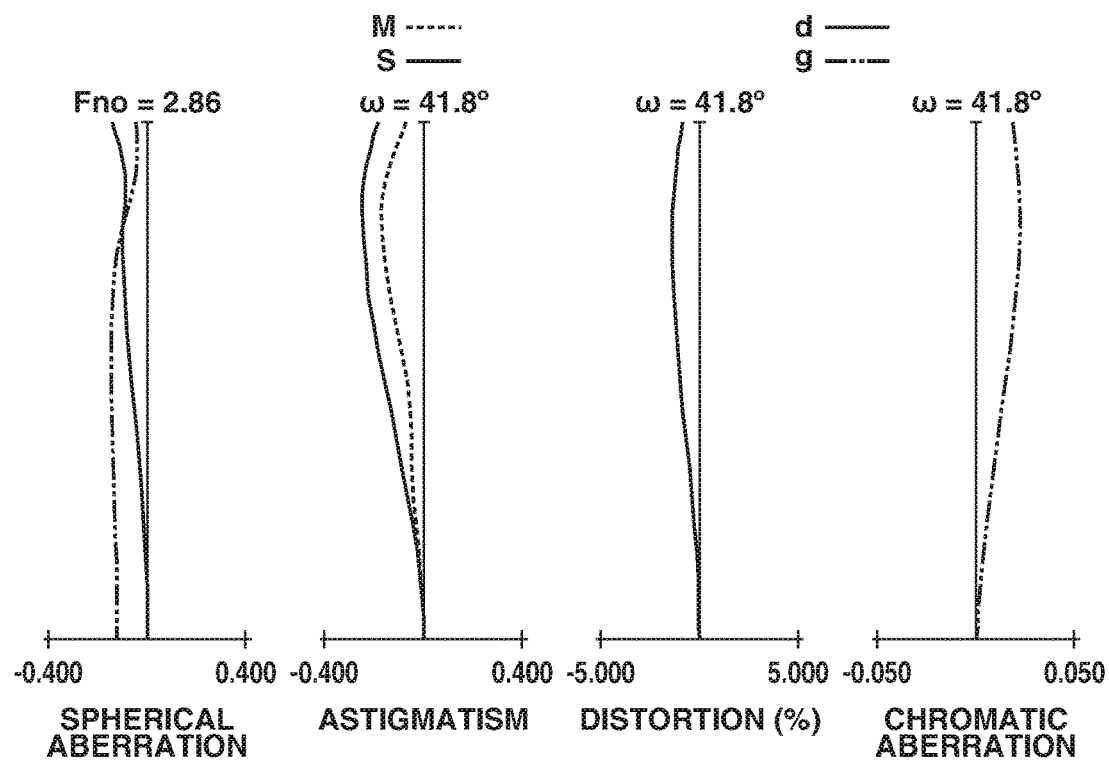
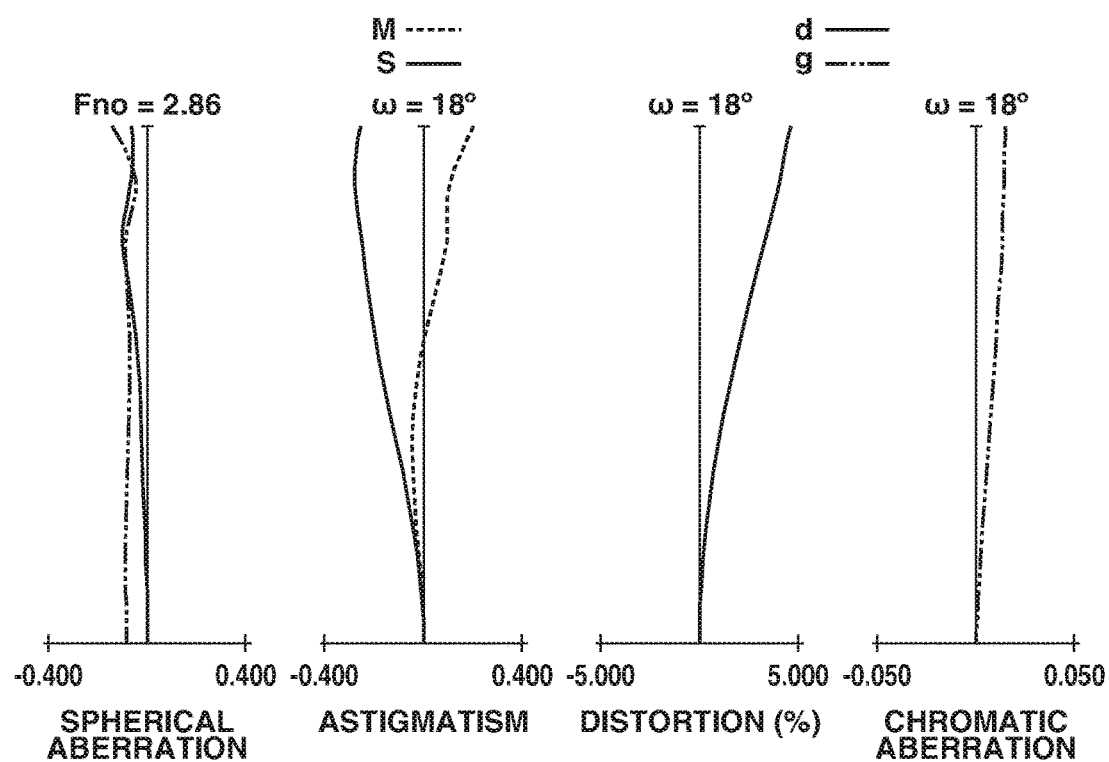

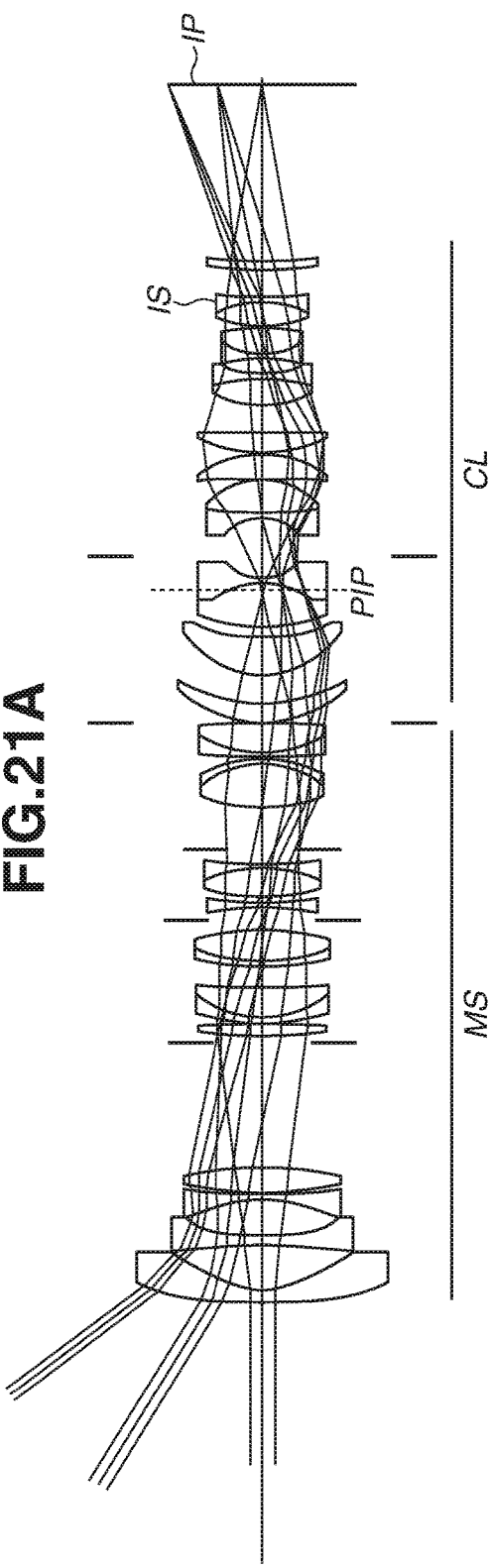
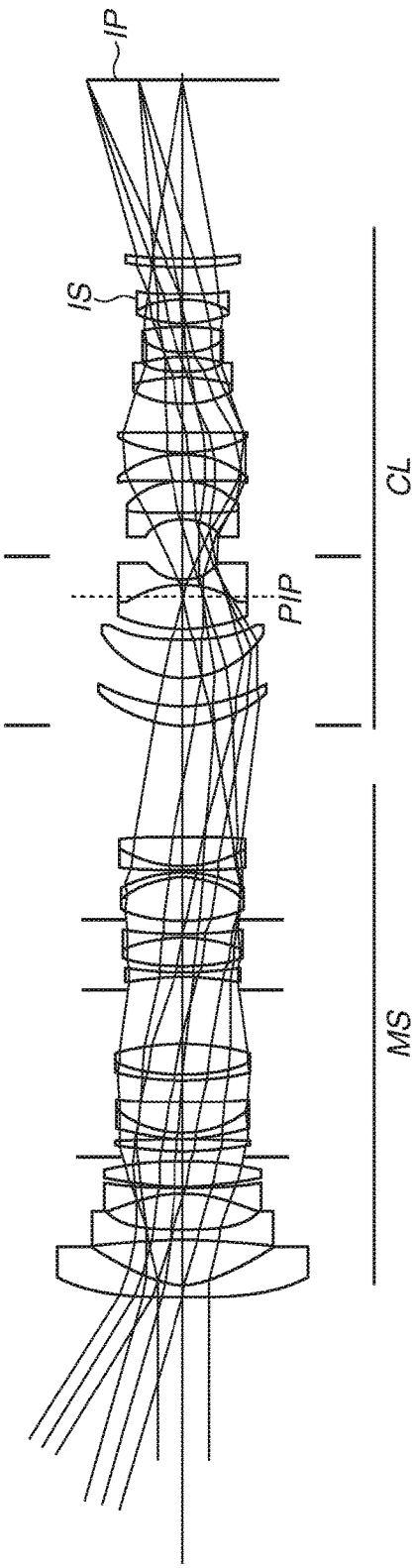

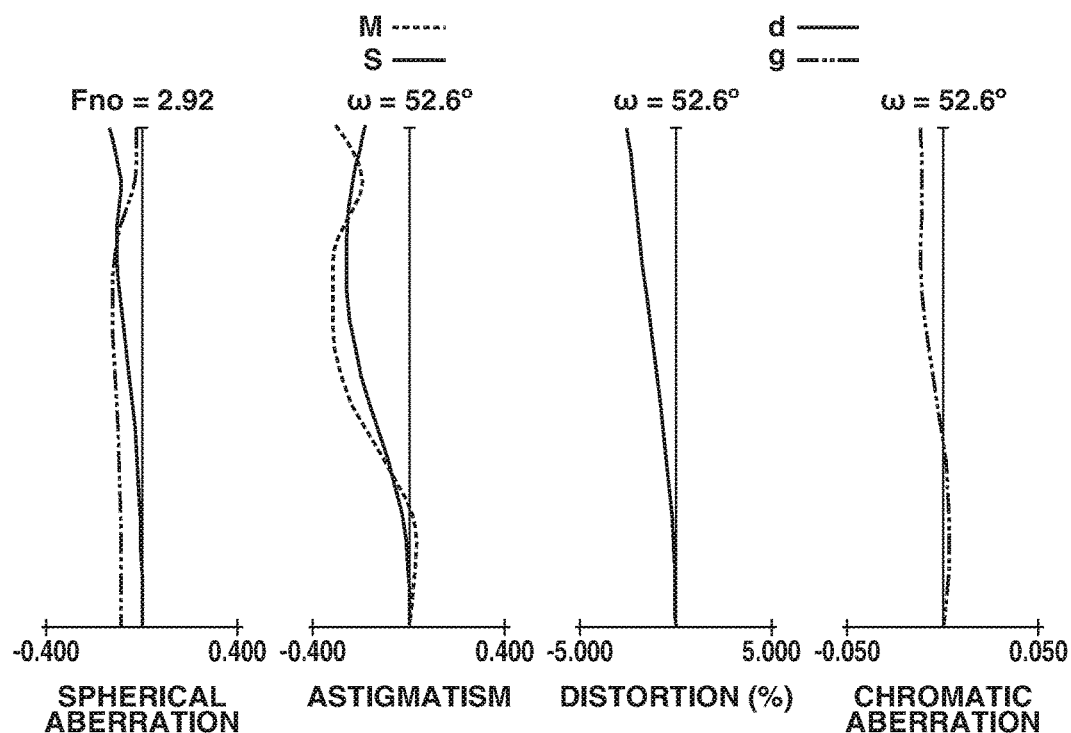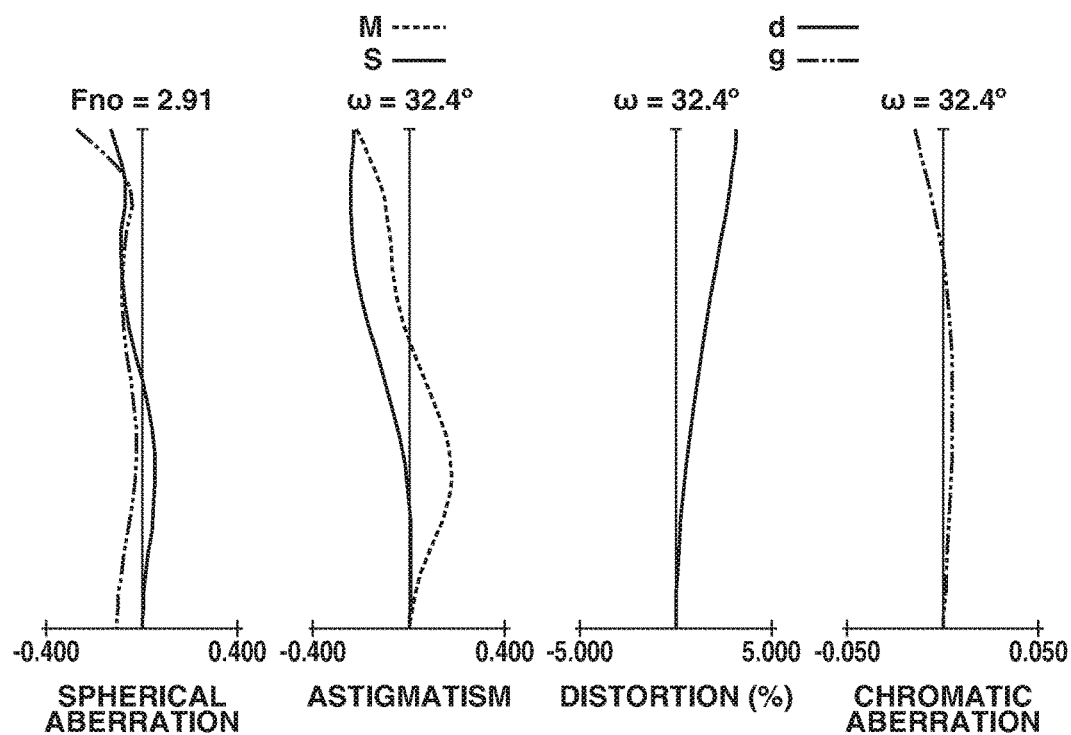

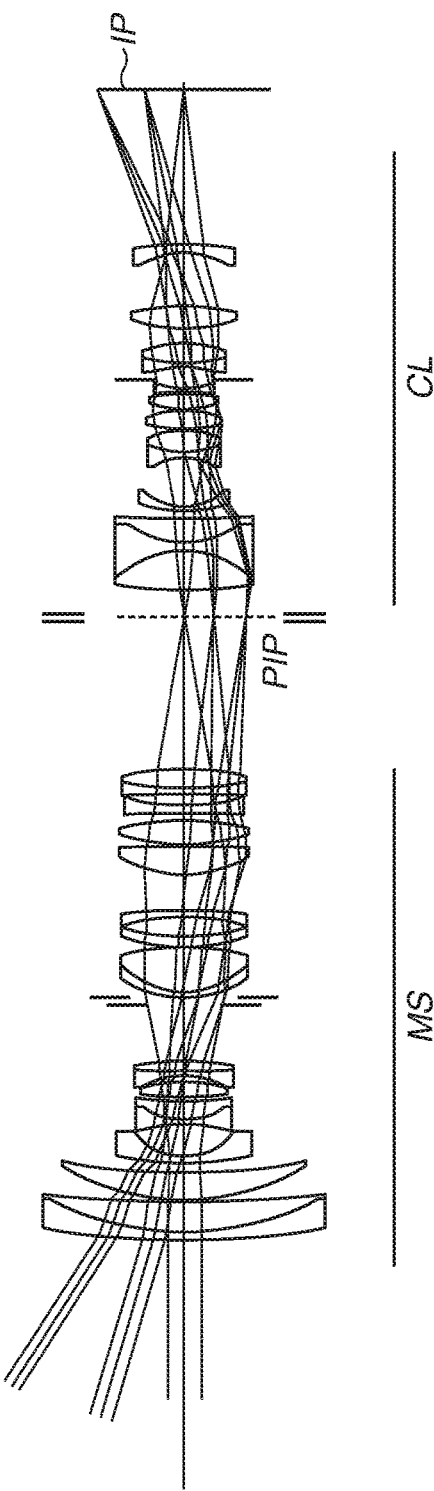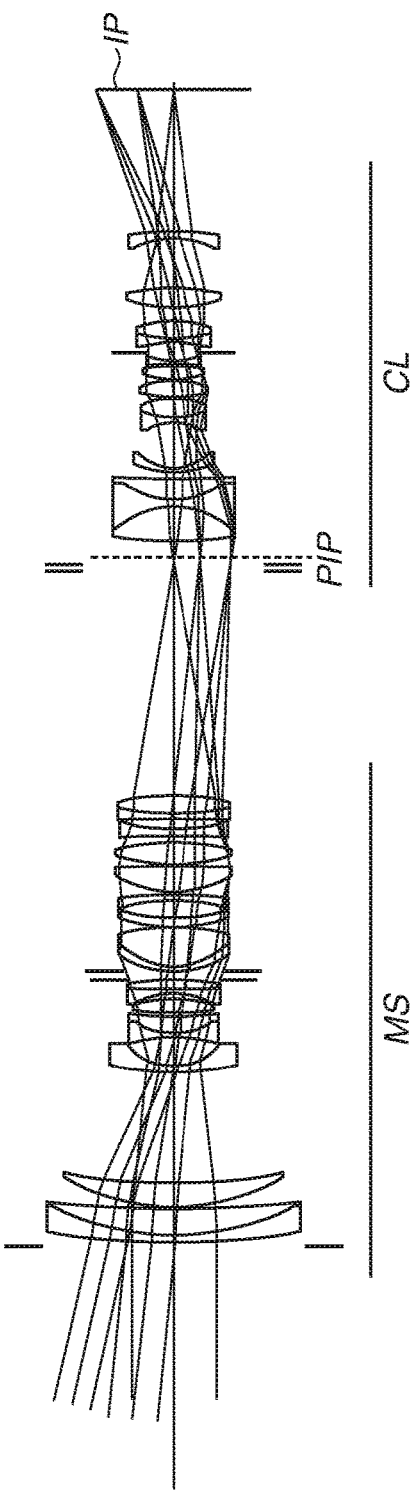

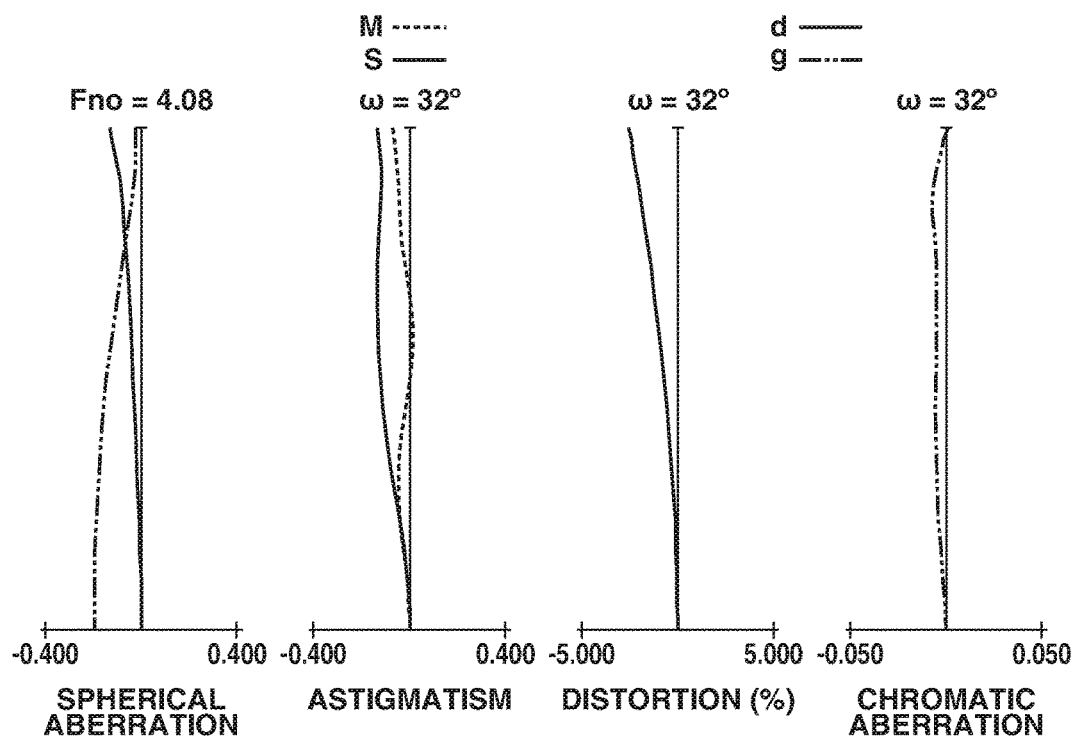
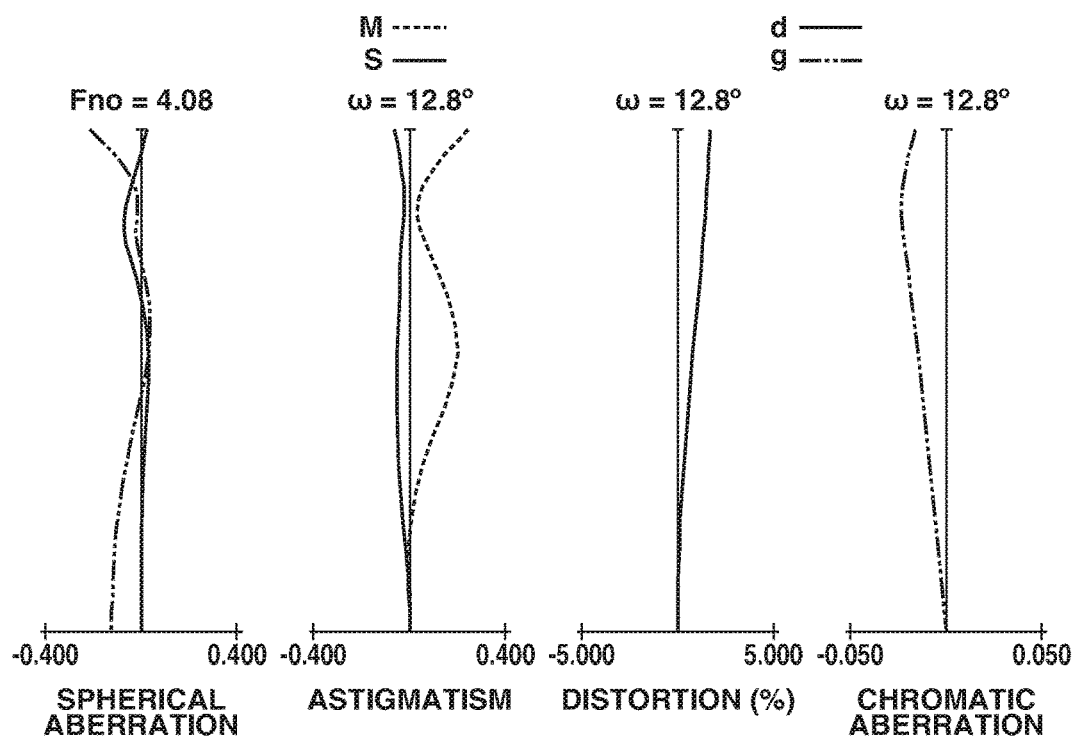

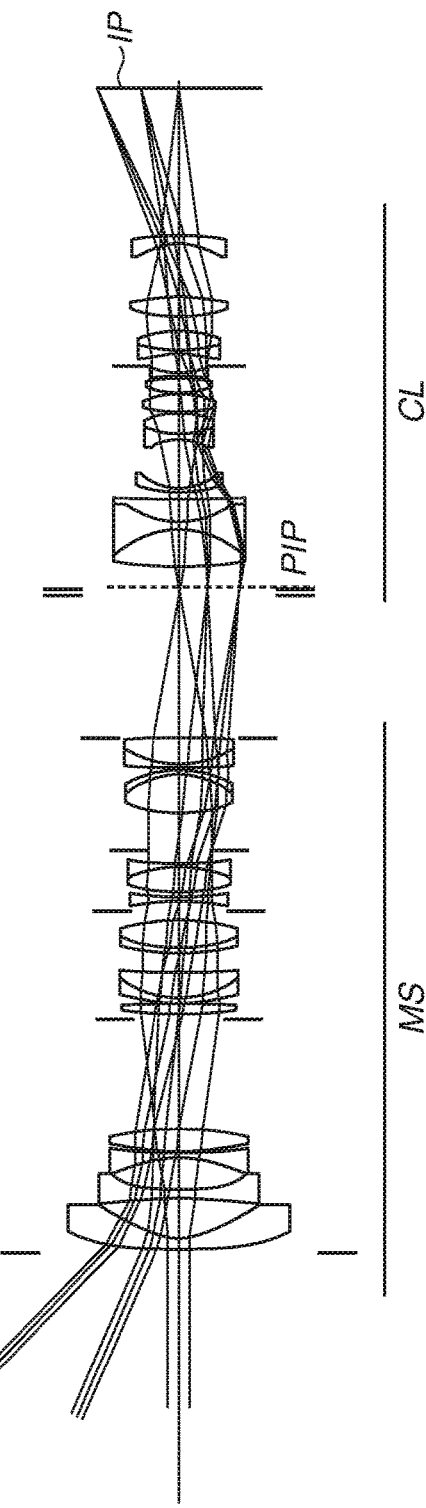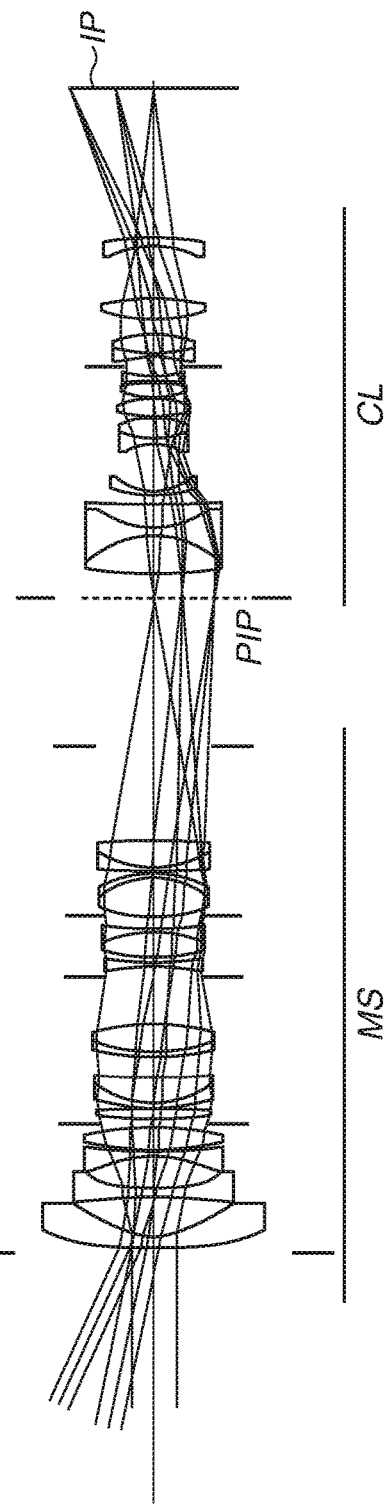

CONVERTER DEVICE AND IMAGE CAPTURING APPARATUS

BACKGROUND OF THE INVENTION

Field of the Invention

The present invention relates to an image capturing apparatus such as a single-lens reflex camera, and a converter device that is attached between an interchangeable lens, which is attachable to and detachable from the image capturing apparatus, and the image capturing apparatus.

Description of the Related Art

In the field of image capturing systems including image capturing apparatuses (e.g., single-lens reflex cameras or mirrorless cameras) and interchangeable lenses that are attachable to and detachable from the image capturing apparatuses, converter devices that are attached between an image capturing apparatus and an interchangeable lens are known. Such image capturing systems expand imaging functions and increases imaging magnifications by using the converter devices. Japanese Patent Application Laid-Open No. 2015-102734 discusses a teleconverter for extending the focal length of an interchangeable lens.

In the teleconverter discussed in Japanese Patent Application Laid-Open No. 2015-102734, a lens component having negative refractive power and a lens component having positive refractive power are arranged in order from the object side. The focal length of the interchangeable lens is extended by making axial light flux be afocal with the lens component having negative refractive power and by converging the light flux with the lens component having positive refractive power. The teleconverter is directed to extending the focal length while keeping optical performance, by arranging the lens component having negative refractive power at a position where the height of an axial ray becomes high.

The teleconverter discussed in Japanese Patent Application Laid-Open No. 2015-102734 is arranged on the image side of an imaging lens that has a long focal length and has a relatively long back focus. When the teleconverter is attached to the imaging lens having a long back focus, the teleconverter can be arranged on the object side comparatively, which makes it possible to arrange the lens component having negative refractive power at a position where the height of an axial ray becomes high. As a result, the focal length of the imaging lens can be readily extended.

On the other hand, when the teleconverter is attached to an imaging lens having a relatively short back focus, the attachment position of the teleconverter is moved toward the image side, as compared with the case where the teleconverter is attached to the imaging lens having a long back focus. In this case, the lens component having negative refractive power is arranged at a position where the height of an axial ray is low, which makes it difficult to sufficiently extend the focal length of the imaging lens.

The back focus typically tends to be short in interchangeable lenses having wide field angles, so that it is often difficult to extend the focal lengths of those interchangeable lenses by attaching converter device between such an interchangeable lens and a camera body.

Further, mirrorless cameras have no quick return mirrors, so that the back focus to be required is shorter as compared with single-lens reflex cameras. Consequently, interchangeable lenses for mirrorless cameras can be readily downsized as compared with interchangeable lenses for single-lens cameras. Meanwhile, from the viewpoint of space, in the interchangeable lenses for mirrorless cameras, it is often difficult to extend the focal length of those interchangeable lenses by attaching a converter device.

As such, conventional converter devices are unsuitable for the interchangeable lenses having relatively wide field angles or the interchangeable lenses for mirrorless cameras. In addition, the conventional converter devices have difficulty sufficiently extending the focal lengths of those interchangeable lenses.

SUMMARY OF THE INVENTION

The present invention is directed to a converter device that can be attached between an interchangeable lens and a camera body, and that has high optical performance.

According to an aspect of the present invention, a converter device to be attached between a lens device, which is attachable to and detachable from an image capturing apparatus, and the image capturing apparatus, the converter device includes a reimaging optical system configured to reimage a primary image formed by the lens device on an image plane as a secondary image, wherein, given that an imaging magnification of the reimaging optical system is represented as $\beta c$, a distance on an optical axis from a lens surface nearest to an object side in the reimaging optical system to the primary image is represented as $Objc$, and a distance on the optical axis from the lens surface nearest to the object side in the reimaging optical system to the secondary image is represented as $Tdc$, the following condition expressions are satisfied:

$$-5.00 < \beta c < -0.55; \text{ and}$$

$$-0.20 < Objc/Tdc < 0.50.$$

Further features of the present invention will become apparent from the following description of exemplary embodiments with reference to the attached drawings.

BRIEF DESCRIPTION OF THE DRAWINGS

FIGS. 2A and 2B illustrate aberration diagrams of the interchangeable lens A at the wide-angle end and the telephoto end, respectively.

FIGS. 4A and 4B illustrate aberration diagrams of the interchangeable lens B at the wide-angle end and the telephoto end, respectively.

FIGS. 7A and 7B are cross sectional views at a wide-angle end and a telephoto end, respectively, when the converter device according to the first exemplary embodiment is attached to the interchangeable lens A.

FIGS. 9A and 9B are cross sectional views at a wide-angle end and a telephoto end, respectively, when the converter device according to the first exemplary embodiment is attached to the interchangeable lens B.

FIGS. 10A and 10B illustrate aberration diagrams at the wide-angle end and the telephoto end, respectively, when the converter device according to the first exemplary embodiment is attached to the interchangeable lens B.

FIGS. 13A and 13B are cross sectional views at a wide-angle end and a telephoto end, respectively, when the converter device according to the second exemplary embodiment is attached to the interchangeable lens A.

FIGS. 14A and 14B illustrate aberration diagrams at the wide-angle end and the telephoto end, respectively, when the converter device according to the second exemplary embodiment is attached to the interchangeable lens A.

FIGS. 15A and 15B are cross sectional views at a wide-angle end and a telephoto end, respectively, when the converter device according to the second exemplary embodiment is attached to the interchangeable lens B.

FIGS. 20A and 20B illustrate aberration diagrams at the wide-angle end and the telephoto end, respectively, when the converter device according to the third exemplary embodiment is attached to the interchangeable lens A.

FIGS. 21A and 21B are cross sectional views at a wide-angle end and a telephoto end, respectively, when the converter device according to the third exemplary embodiment is attached to the interchangeable lens B.

FIGS. 22A and 22B illustrate aberration diagrams at the wide-angle end and the telephoto end, respectively, when the converter device according to the third exemplary embodiment is attached to the interchangeable lens B.

FIGS. 25A and 25B are cross sectional views at a wide-angle end and a telephoto end, respectively, when the converter device according to the fourth exemplary embodiment is attached to the interchangeable lens A.

FIGS. 26A and 26B illustrate aberration diagrams at the wide-angle end and the telephoto end, respectively, when the converter device according to the fourth exemplary embodiment is attached to the interchangeable lens A.

FIGS. 27A and 27B are cross sectional views at a wide-angle end and a telephoto end, respectively, when the converter device according to the fourth exemplary embodiment is attached to the interchangeable lens B.

DESCRIPTION OF THE EMBODIMENTS

Hereinafter, converter devices and image capturing apparatuses according to exemplary embodiments of the invention will be described in detail based on the accompanying drawings. The converter devices according to the exemplary embodiments of the present invention are each attached between an interchangeable lens, which is attachable to and detachable from the image capturing apparatus (camera body), and the camera body.

The converter devices according to the exemplary embodiments of the present invention each have a reimaging optical system CL for reimaging a primary image formed by an imaging optical system MS included in the interchangeable lens on an imaging plane to form a secondary image. With this configuration, converter devices that can be used also for an interchangeable lens having a short back focus can be obtained.

Japanese Patent Application Laid-Open No. 2004-46022 and Japanese Patent Application Laid-Open No. 2002-131637 each discuss a relay optical system of a reimaging type for imaging light flux having passed through an imaging optical system, in which the height of an axial ray becomes relatively high, on a small image capturing element. The relay optical systems are systems that cause the imaging optical system corresponding to the size of an image capturing element A to correspond to an image capturing element B smaller than the image capturing element A. When light emitted from the imaging optical system is imaged on the image capturing element B without causing the light to pass through the relay optical system, light of a marginal area fails to be imaged on the image capturing element. Causing the light emitted from the imaging optical system to be imaged on the image capturing element B via the relay optical system makes it possible to perform an imaging operation with no light of the marginal area being vignetted. In other words, in the image capturing systems discussed in Japanese Patent Application Laid-Open No. 2004-46022 and Japanese Patent Application Laid-Open No. 2002-131637, the light of the marginal area is vignetted when the camera body including the image capturing element B, and the interchangeable lens only are combined.

On the other hand, the converter devices according to the exemplary embodiments of the present invention are applicable to an image capturing system capable of performing an imaging operation with no light in a marginal area being vignetted even in the case where only an interchangeable lens and a camera body are combined. The imaging system is capable of imaging a subject image in the marginal area regardless of presence or absence of the converter device, and is further capable of achieving increase in imaging magnifications and expansion of imaging functions by using the converter device.

Figure 29A:
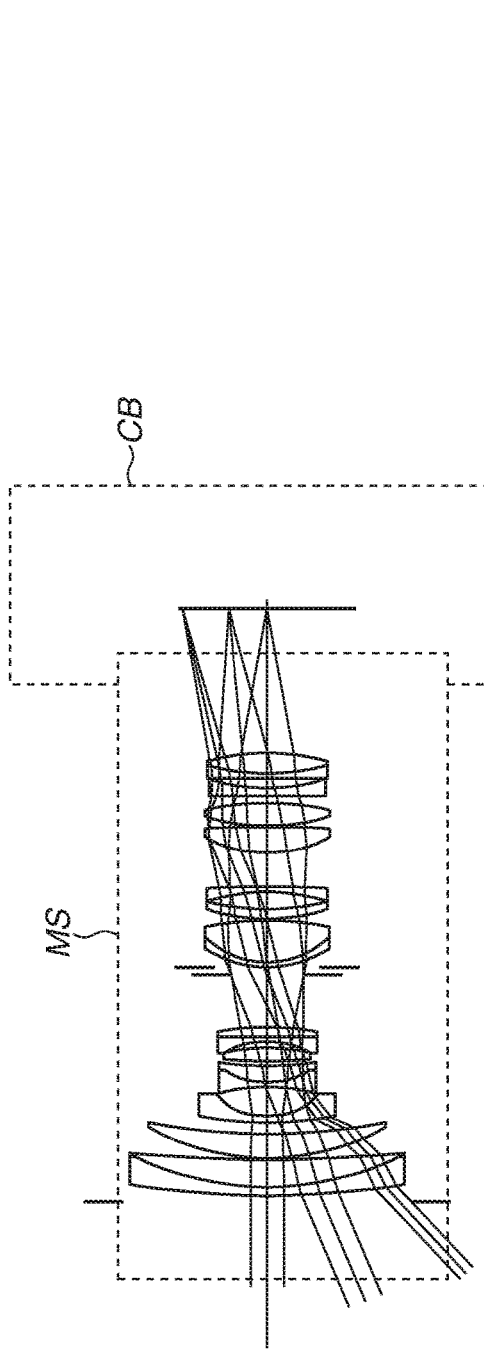
FIGS. 29A and 29B are schematic diagrams of an image capturing system when a converter device is detached and attached, respectively.
Figure 29B:
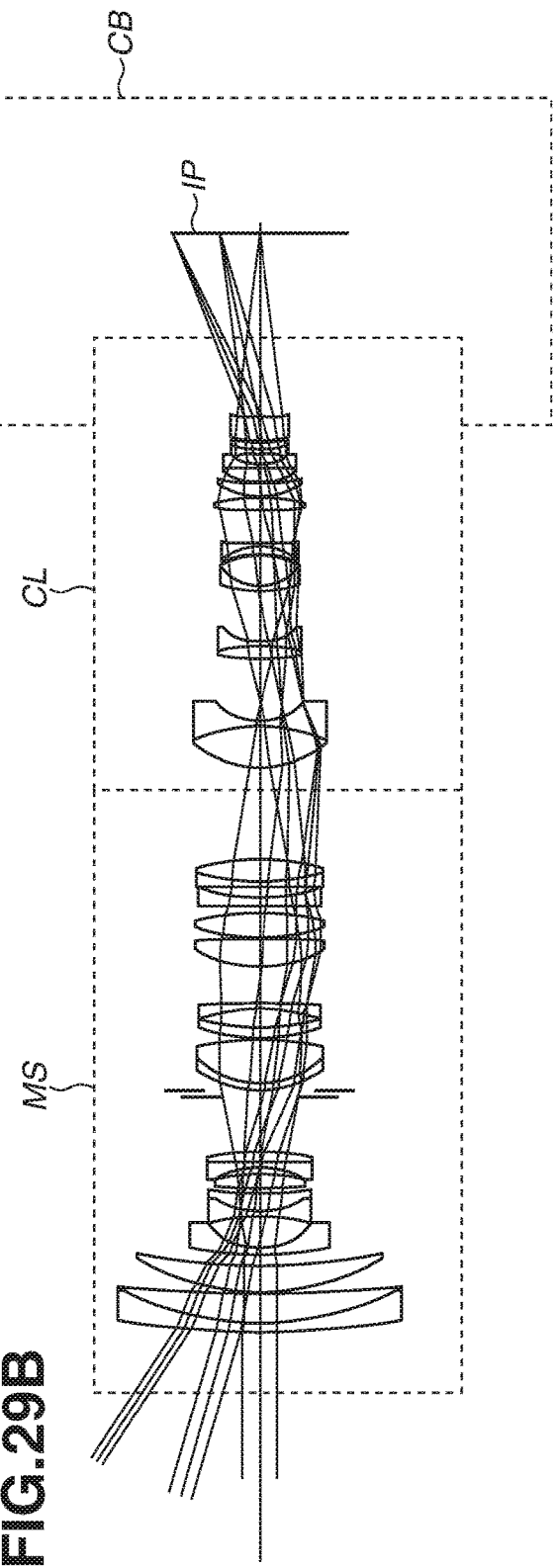

As illustrated in FIG. 29A, the converter devices according to the exemplary embodiments of the present invention can be applied to the system capable of imaging with no light in the marginal area being vignetted in the state where the interchangeable lens is attached to the camera body CB with no converter device intervening. Further, as illustrated in FIG. 29B, the converter device can be attached between the camera body CB and the interchangeable lens, and a subject image can be imaged on an imaging plane with no light in the marginal area being vignetted also in the state where the converter device is attached therebetween. By configuring the reimaging optical system to reimage the primary image formed by the imaging optical system of the interchangeable lens, the converter device can be downsized.

Figure 1A:
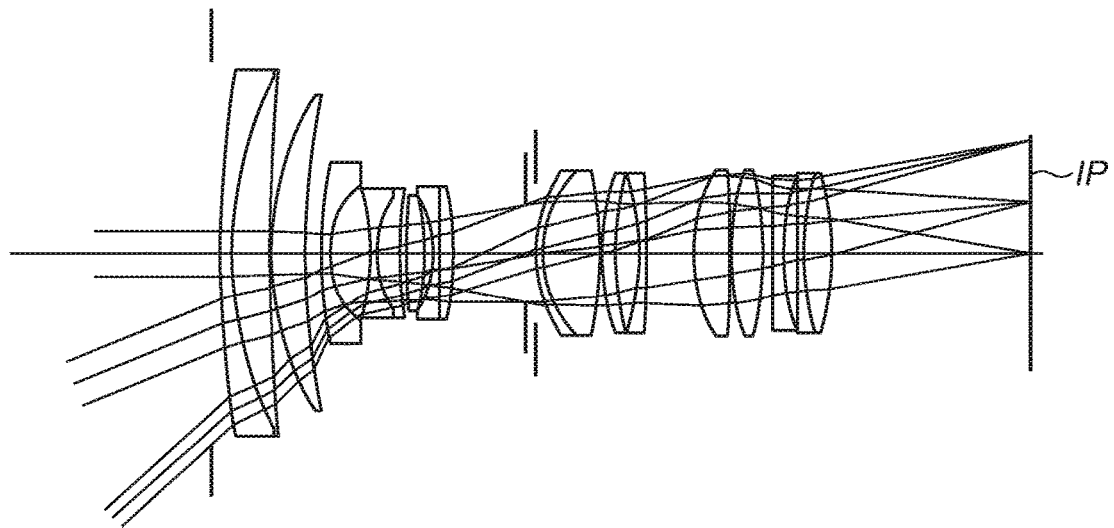
FIGS. 1A and 1B are cross sectional views of an interchangeable lens A at a wide-angle end and a telephoto end, respectively.
Figure 1B:
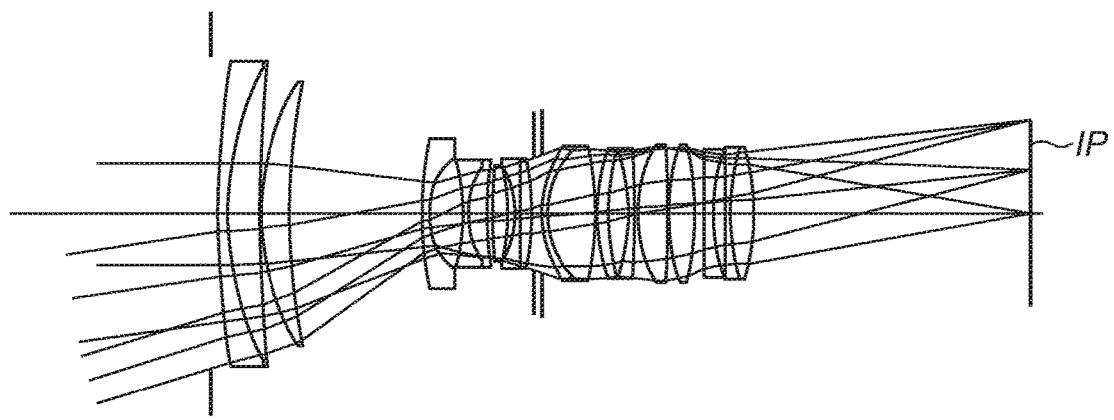

FIGS. 1A and 1B are each a lens cross sectional view of an optical system of an interchangeable lens A to which the converter device according to an exemplary embodiment of the present invention can be attached. FIGS. 1A and 1B are lens cross sectional views at a wide-angle end and a telephoto end, respectively. FIGS. 2A and 2B illustrate aberration diagrams of the optical system of the interchangeable lens A at the wide-angle end and the telephoto end, respectively.

Figure 3A:
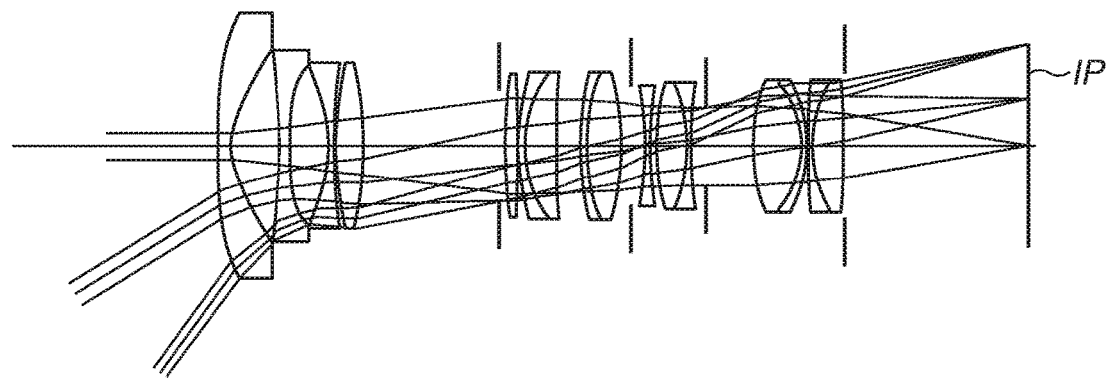
FIGS. 3A and 3B are cross sectional views of an interchangeable lens B at a wide-angle end and a telephoto end, respectively.
Figure 3B:
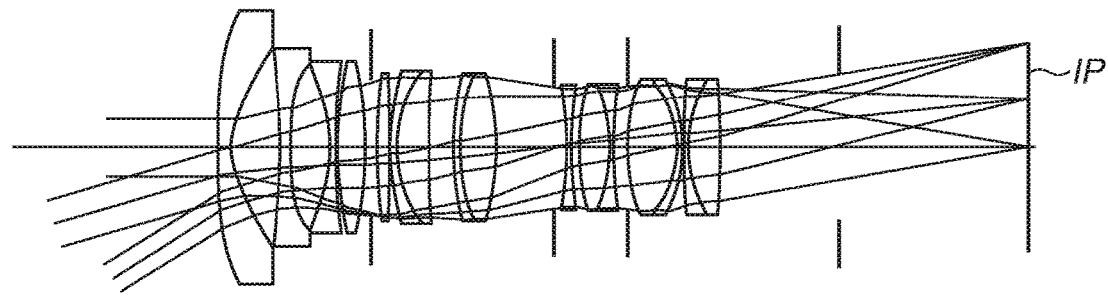

FIGS. 3A and 3B are each a lens cross sectional view of an optical system of an interchangeable lens B to which the converter device according to an exemplary embodiment of the present invention can be attached. FIGS. 3A and 3B are lens cross sectional views at a wide-angle end and a telephoto end, respectively. FIGS. 4A and 4B illustrate aberration diagrams of the optical system of the interchangeable lens B at the wide-angle end and the telephoto end, respectively.

Figure 5:
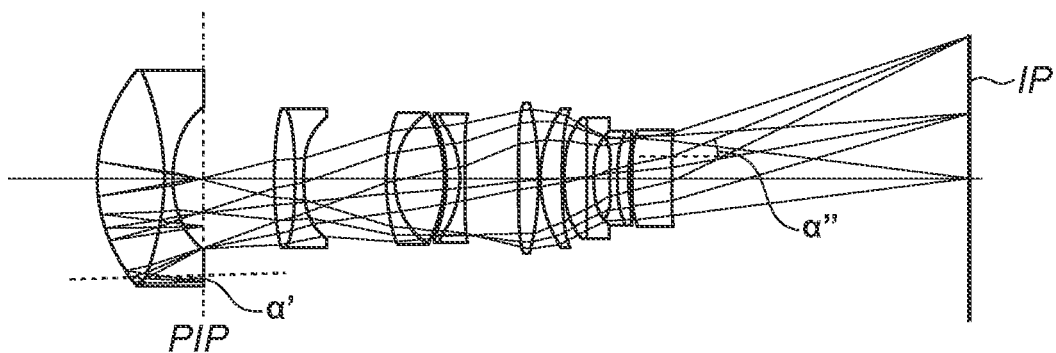
FIG. 5 is a cross sectional view of a converter device according to a first exemplary embodiment.
Figure 6:
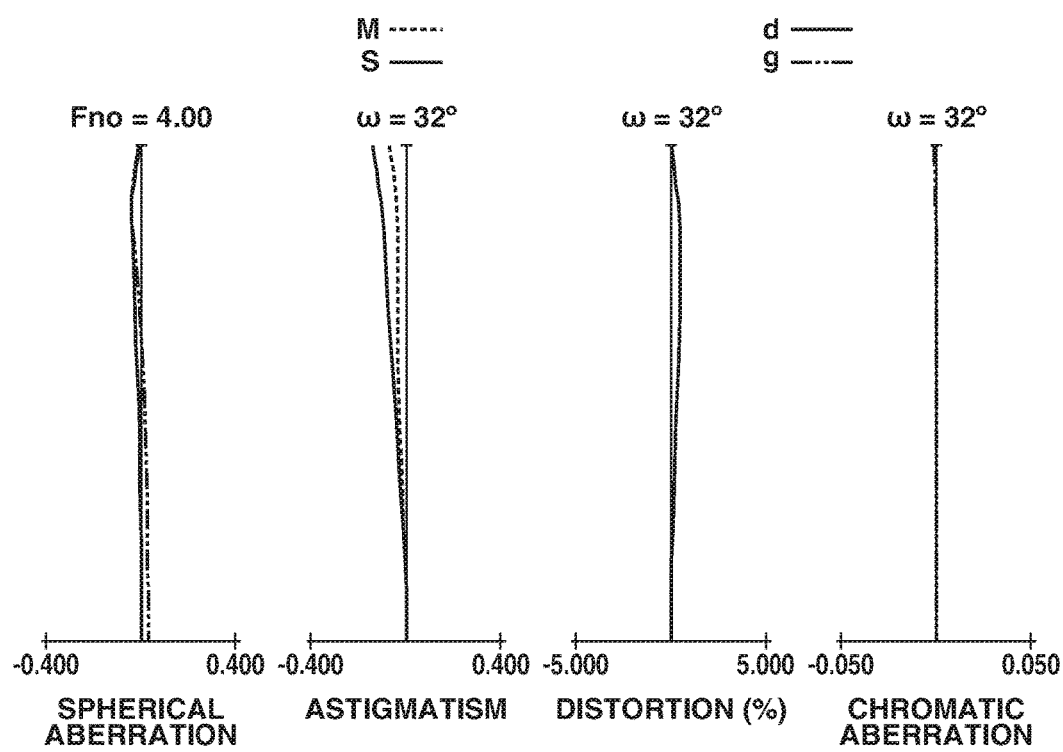
FIG. 6 illustrates aberration diagrams of the converter device according to the first exemplary embodiment.

FIG. 5 is a cross sectional view of a converter device according to a first exemplary embodiment. FIG. 6 illustrates aberration diagrams of only the converter device according to the first exemplary embodiment. Herein, the aberration diagrams of only the converter device denote the aberration diagrams in the case where an image is formed by only the converter device with respect to a subject of an infinite object. The same applies to the following aberration diagrams.

Figure 8A:
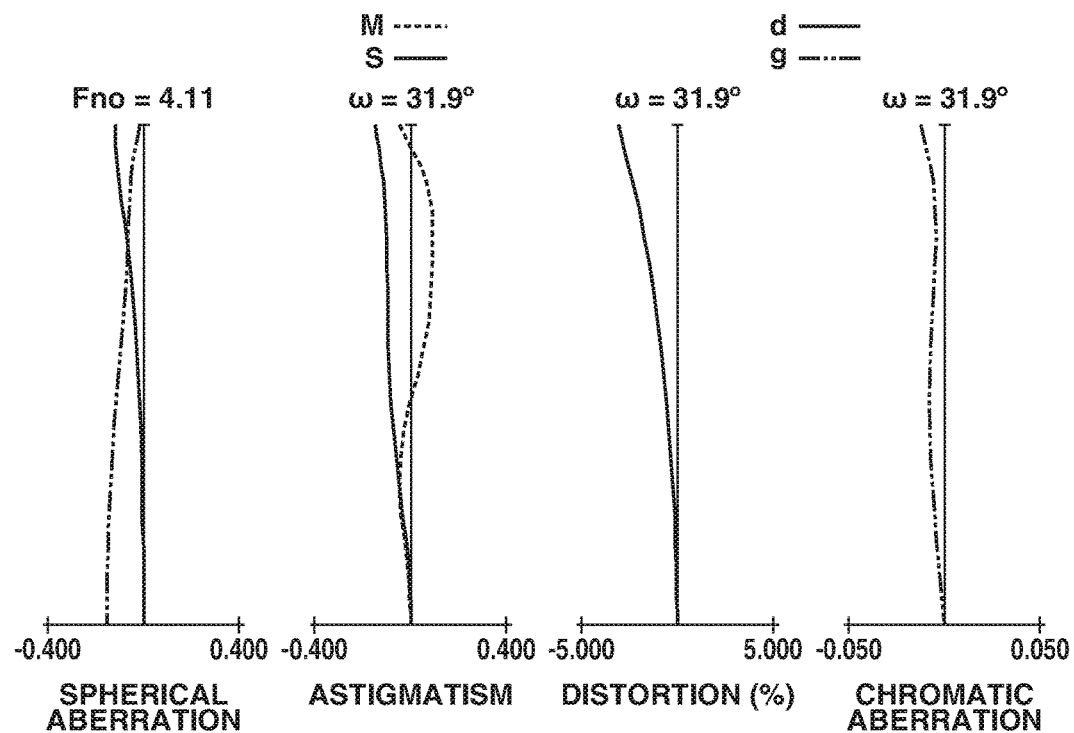
FIGS. 8A and 8B illustrate aberration diagrams at the wide-angle end and the telephoto end, respectively, when the converter device according to the first exemplary embodiment is attached to the interchangeable lens A.
Figure 8B:
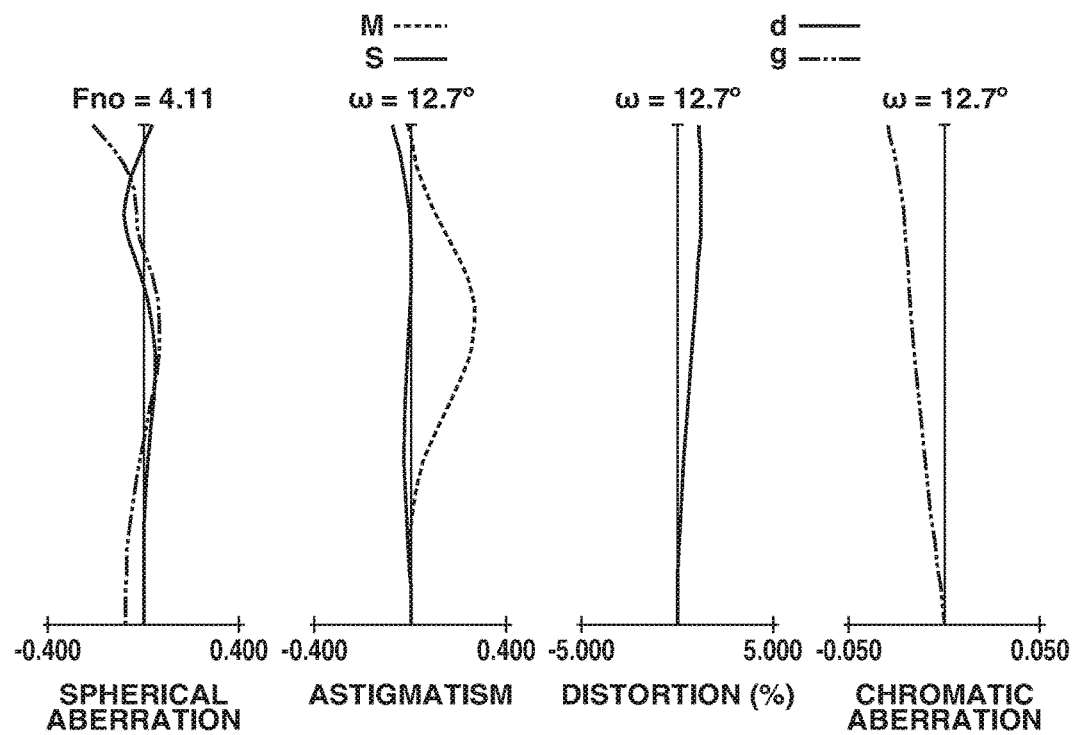

FIGS. 7A and 7B are lens cross sectional views at a wide-angle end and a telephoto end, respectively, when the converter device according to the first exemplary embodiment is attached to the interchangeable lens A. FIGS. 8A and 8B illustrate aberration diagrams at the wide-angle end and the telephoto end, respectively, when the converter device according to the first exemplary embodiment is attached to the interchangeable lens A. FIGS. 9A and 9B are lens cross sectional views at a wide-angle end and a telephoto end, respectively, when the converter device according to the first exemplary embodiment is attached to the interchangeable lens B. FIGS. 10A and 10B illustrate aberration diagrams at the wide-angle end and the telephoto end, respectively, when the converter device according to the first exemplary embodiment is attached to the interchangeable lens B.

Figure 11:
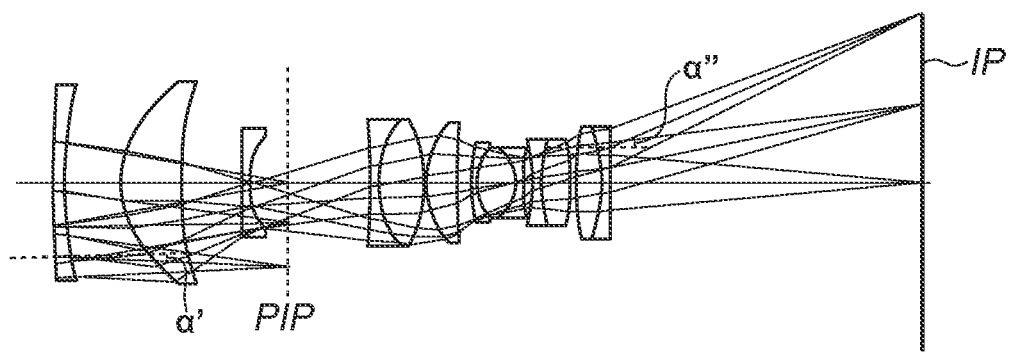
FIG. 11 is a cross sectional view of a converter device according to a second exemplary embodiment.
Figure 12:
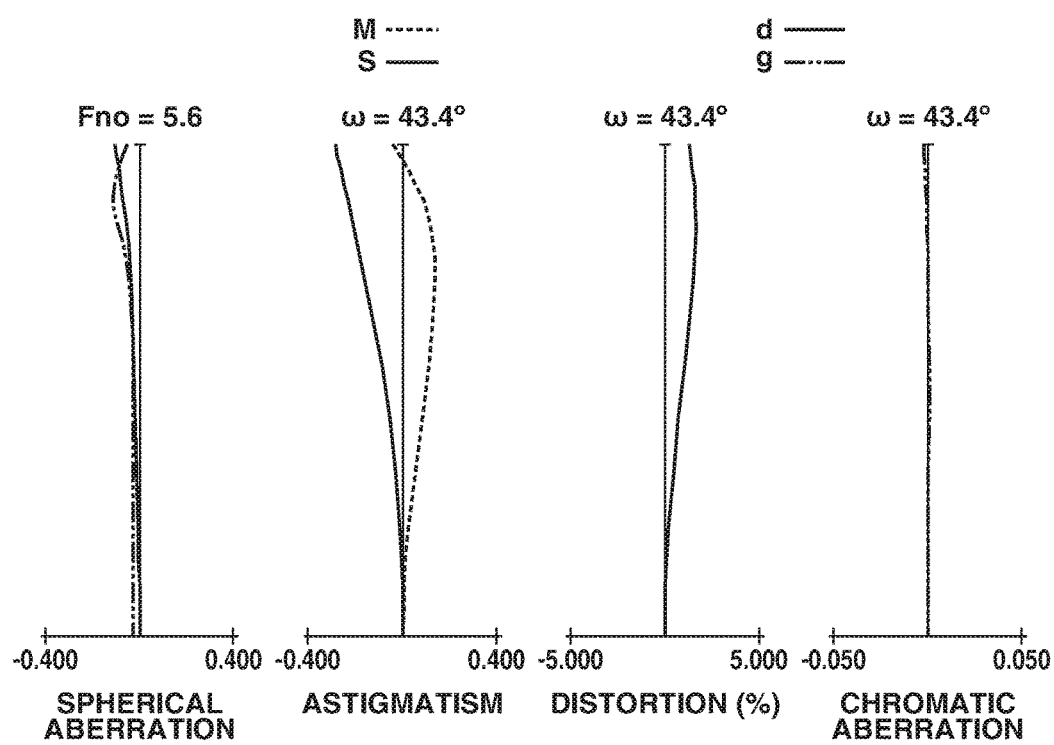
FIG. 12 illustrates aberration diagrams of the converter device according to the second exemplary embodiment.
Figure 16A:
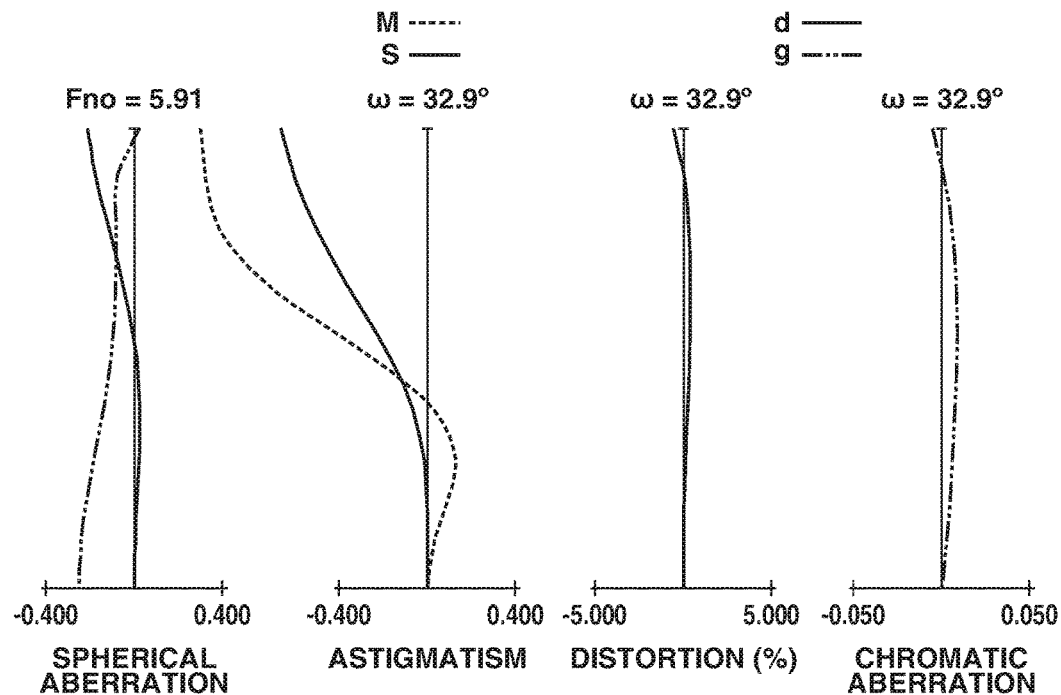
FIGS. 16A and 16B illustrate aberration diagrams at the wide-angle end and the telephoto end, respectively, when the converter device according to the second exemplary embodiment is attached to the interchangeable lens B.
Figure 16B:
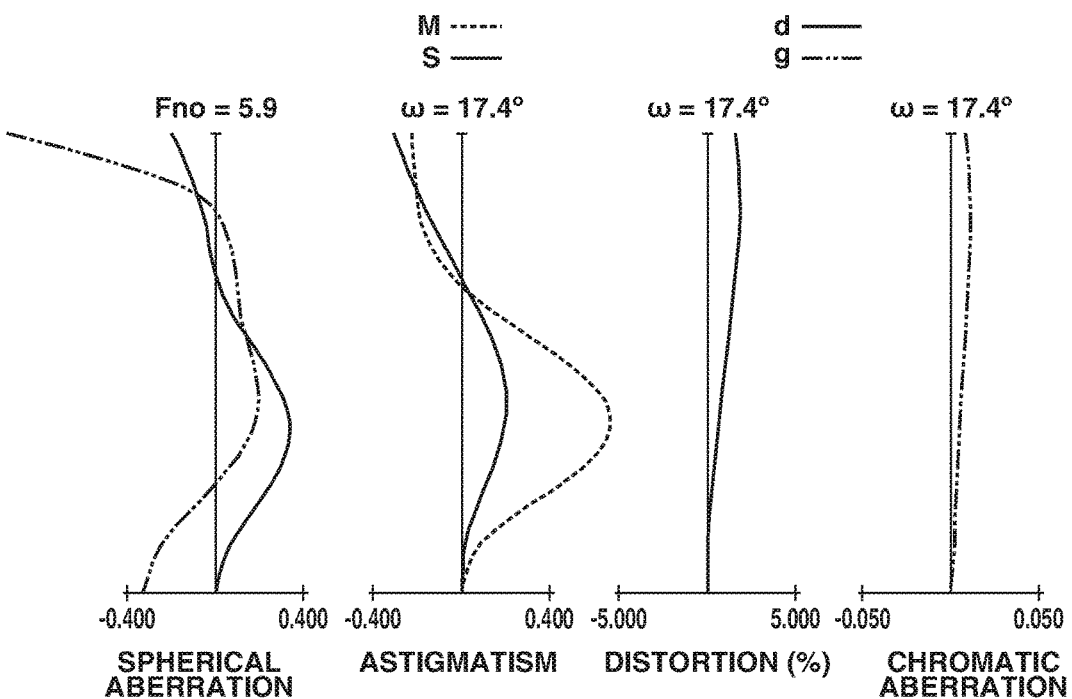

FIG. 11 is a cross sectional view of a converter device according to a second exemplary embodiment. FIG. 12 illustrates aberration diagrams of only the converter device according to the second exemplary embodiment. FIGS. 13A and 13B are lens cross sectional views at a wide-angle end and a telephoto end, respectively, when the converter device according to the second exemplary embodiment is attached to the interchangeable lens A. FIGS. 14A and 14B illustrate aberration diagrams at the wide-angle end and the telephoto end, respectively, when the converter device according to the second exemplary embodiment is attached to the interchangeable lens A. FIGS. 15A and 15B are lens cross sectional views at a wide-angle end and a telephoto end, respectively, when the converter device according to the second exemplary embodiment is attached to the interchangeable lens B. FIGS. 16A and 16B illustrate aberration diagrams at the wide-angle end and the telephoto end, respectively, when the converter device according to the second exemplary embodiment is attached to the interchangeable lens B.

Figure 17:
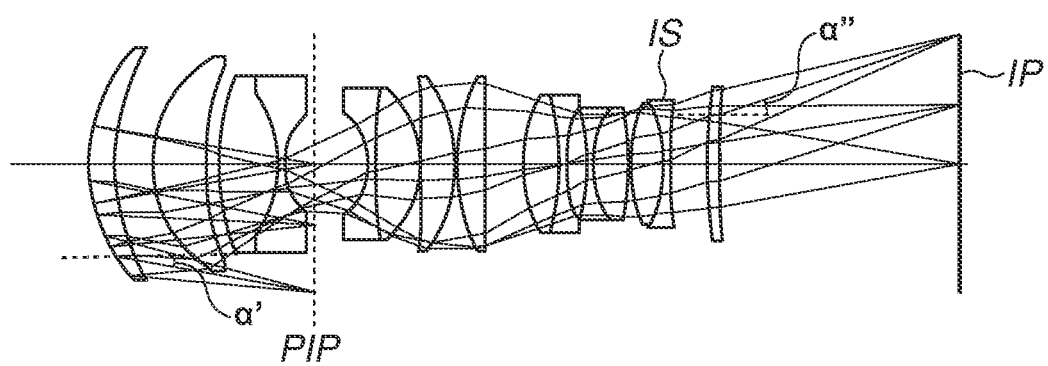
FIG. 17 is a cross sectional view of a converter device according to a third exemplary embodiment.
Figure 18:
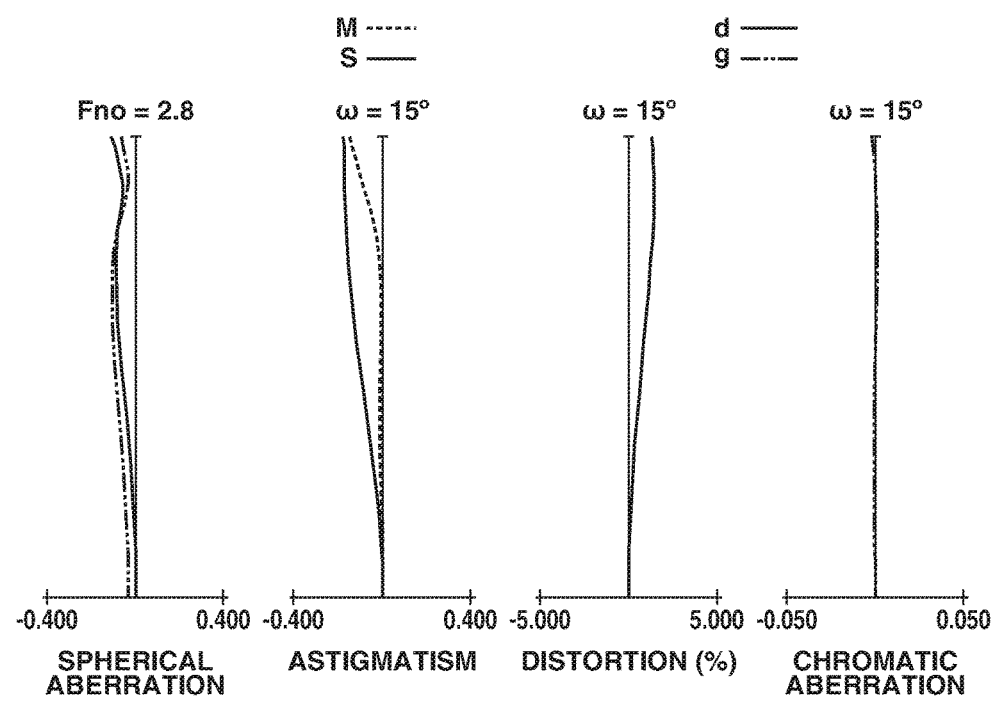
FIG. 18 illustrates aberration diagrams of the converter device according to the third exemplary embodiment.
Figure 19A:
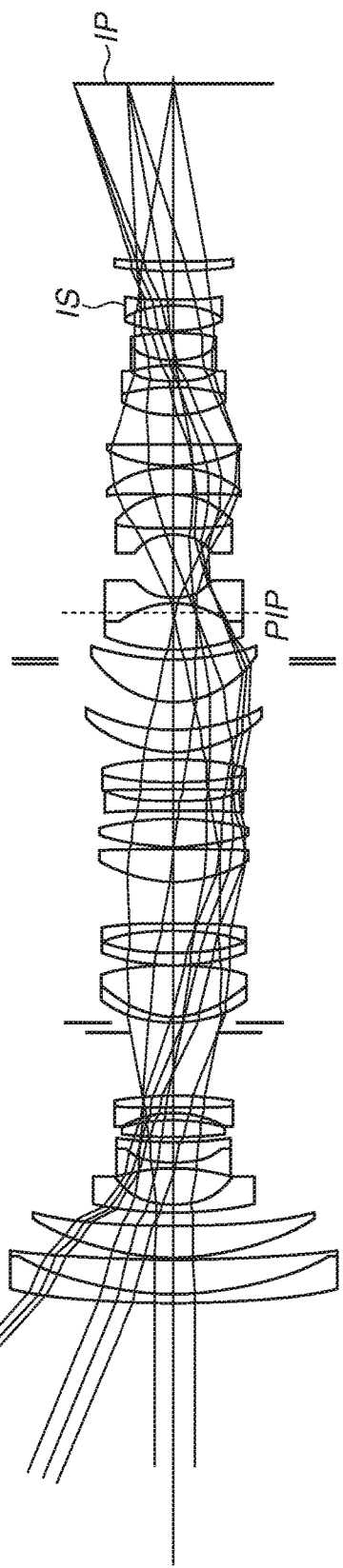
FIGS. 19A and 19B are cross sectional views at a wide-angle end and a telephoto end, respectively, when the converter device according to the third exemplary embodiment is attached to the interchangeable lens A.
Figure 19B:
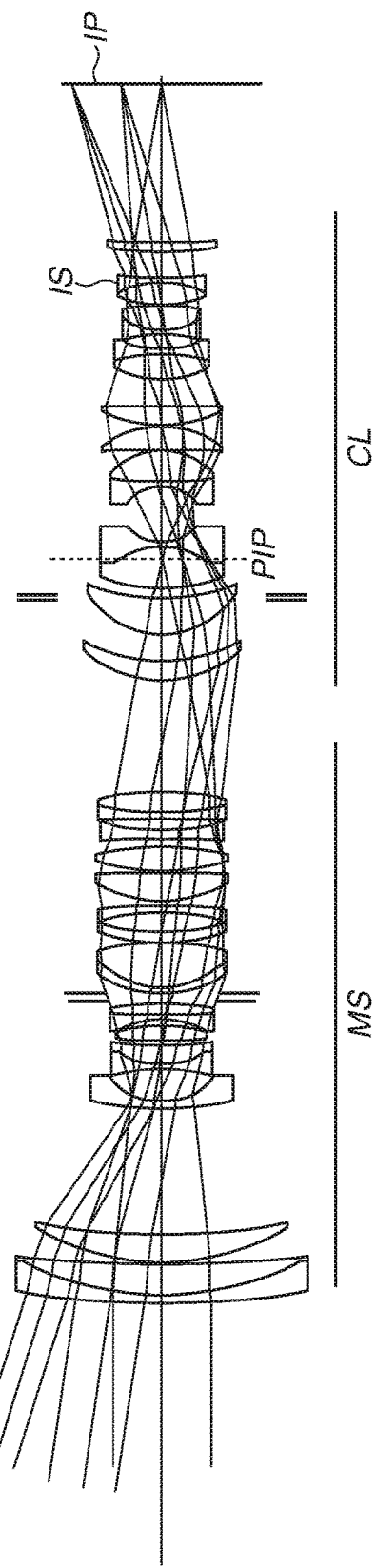

FIG. 17 is a cross sectional view of a converter device according to a third exemplary embodiment. FIG. 18 illustrates aberration diagrams of only the converter device according to the third exemplary embodiment. FIGS. 19A and 19B are lens cross sectional views at a wide-angle end and a telephoto end, respectively, when the converter device according to the third exemplary embodiment is attached to the interchangeable lens A. FIGS. 20A and 20B illustrate aberration diagrams at the wide-angle end and the telephoto end, respectively, when the converter device according to the third exemplary embodiment is attached to the interchangeable lens A. FIGS. 21A and 21B are lens cross sectional views at a wide-angle end and a telephoto end, respectively, when the converter device according to the third exemplary embodiment is attached to the interchangeable lens B. FIGS. 22A and 22B illustrate aberration diagrams at the wide-angle end and the telephoto end, respectively, when the converter device according to the third exemplary embodiment is attached to the interchangeable lens B.

Figure 23:
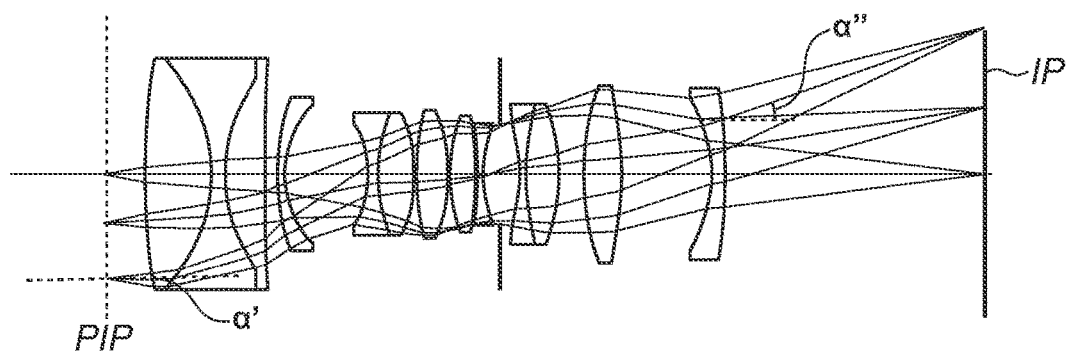
FIG. 23 is a cross sectional view of a converter device according to a fourth exemplary embodiment.
Figure 24:
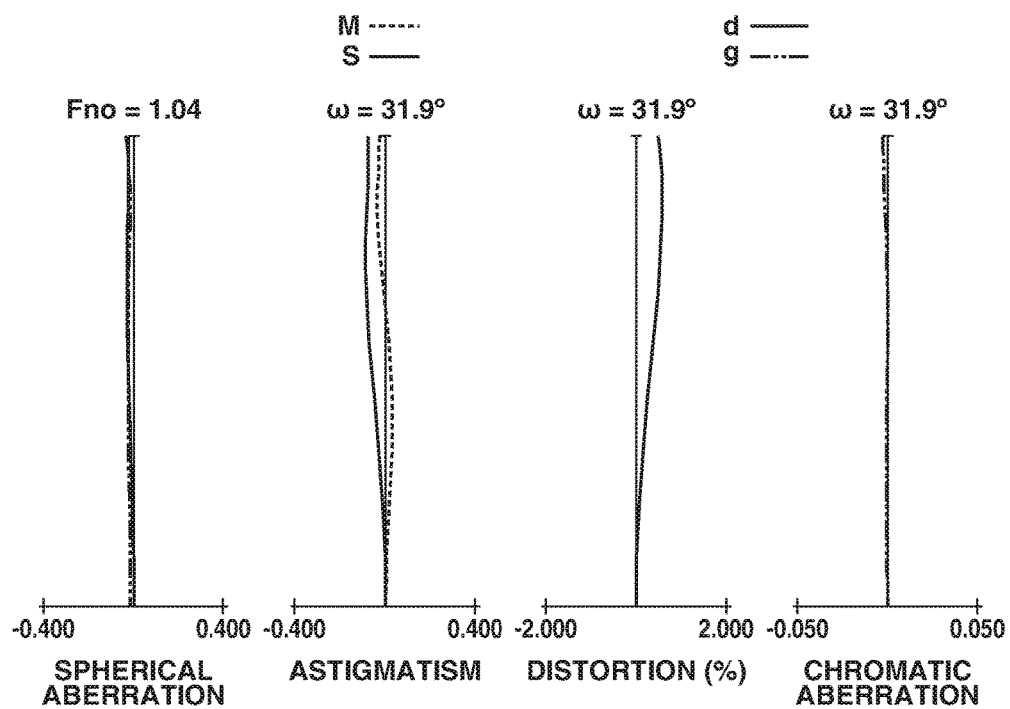
FIG. 24 illustrates aberration diagrams of the converter device according to the fourth exemplary embodiment.
Figure 28A:
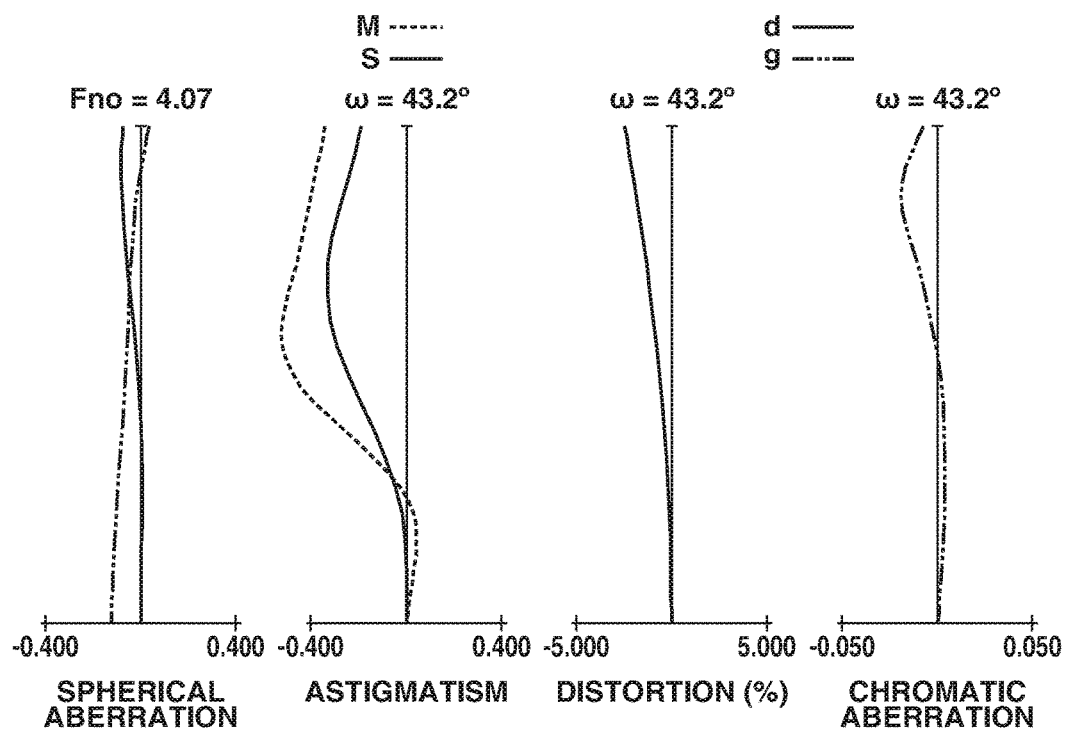
FIGS. 28A and 28B illustrate aberration diagrams at the wide-angle end and the telephoto end, respectively, when the converter device according to the fourth exemplary embodiment is attached to the interchangeable lens B.
Figure 28B:
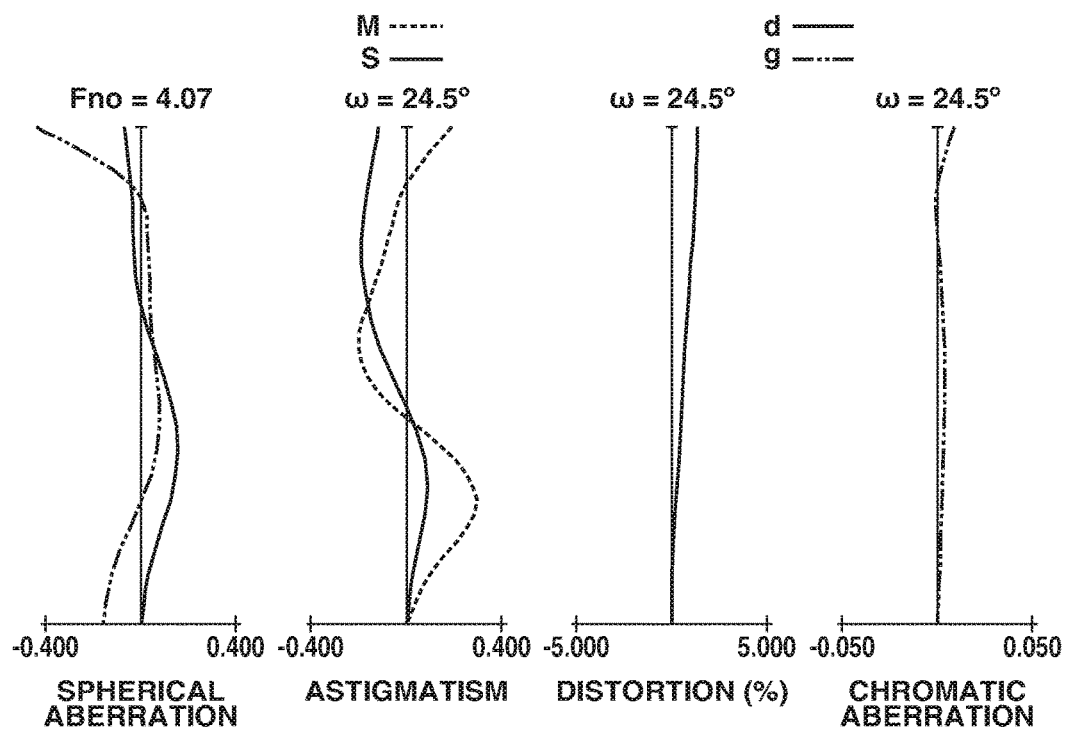

FIG. 23 is a cross sectional view of a converter device according to a fourth exemplary embodiment. FIG. 24 illustrates aberration diagrams of only the converter device according to the fourth exemplary embodiment. FIGS. 25A and 25B are lens cross sectional views at a wide-angle end and a telephoto end, respectively, when the converter device according to the fourth exemplary embodiment is attached to the interchangeable lens A. FIGS. 26A and 26B illustrate aberration diagrams at the wide-angle end and the telephoto end, respectively, when the converter device according to the fourth exemplary embodiment is attached to the interchangeable lens A. FIGS. 27A and 27B are lens cross sectional views at a wide-angle end and a telephoto end, respectively, when the converter device according to the fourth exemplary embodiment is attached to the interchangeable lens B. FIGS. 28A and 28B illustrate aberration diagrams at the wide-angle end and the telephoto end, respectively, when the converter device according to the fourth exemplary embodiment is attached to the interchangeable lens B.

In each lens cross sectional view, the left side is the object side (front side), and the right side is the image side (rear side). IP denotes an image plane. When the converter device according to an exemplary embodiment of the present invention is used for a video camera or a digital camera, the image plane IP corresponds to a solid-state image capturing element (photoelectric conversion element) such as a charge coupled device (CCD) sensor or a complementary metal oxide semiconductor (CMOS) sensor for receiving an image formed by the reimaging optical system. When the converter device according to an exemplary embodiment of the present invention is used for a silver-halide film camera, the image plane IP corresponds to a film plane. The imaging plane of the secondary image formed by the reimaging optical system is located on the image plane IP.

In the spherical aberration diagrams, Fno denotes an F-number, and spherical aberrations with respect to a d line (wavelength 587.6 nm) and a g line (wavelength 435.8 nm) are indicated. In the astigmatism diagrams, S denotes a sagittal image plane, and M denotes a meridional image plane. The distortion diagrams each indicate a d line. The chromatic aberration diagrams each illustrate a chromatic aberration with respect to a g line. The sign of ω denotes an imaging half angle of view.

Given that the imaging magnification of the reimaging optical system is represented as βc, the distance on the optical axis from the lens surface nearest to the object side in the reimaging optical system to the primary image is represented as Objc, and the distance on the optical axis from the lens surface nearest to the object side in the reimaging optical system to the secondary image is represented as Tdc, the reimaging optical system of each exemplary embodiment satisfies the following condition expressions.

$$-5.00 < \beta c < -0.55 \quad (1)$$

$$-0.20 < Objc/Tdc < 0.50 \quad (2)$$

The sign of Objc is positive when the primary image is located on the image side more than the lens surface nearest to the object side in the reimaging optical system.

The imaging magnification becomes a negative value because the primary image is reversed by the reimaging optical system, and reimaged on the imaging plane as the secondary image. In the system in which the converter device is attached between the interchangeable lens and the camera body, when the magnification of the converter device is too low, an off-axis ray is vignetted when the converter device is attached therebetween. Further, increasing the effective diameter of the interchangeable lens in advance to avoid the off-axis ray from being vignetted is not desirable because this leads to increase in size of the interchangeable lens.

In the converter device according to an exemplary embodiment of the present invention, the reimaging optical system is configured so that the imaging magnification of the reimaging optical system becomes high. This avoids the off-axis ray from being vignetted when the converter device is attached without leading to increase in the size of the interchangeable lens. The converter device according to an exemplary embodiment of the present invention also achieves increase in imaging magnifications and expansion of imaging functions.

When the imaging magnification βc of the reimaging optical system becomes high and exceeds the lower limit in the condition expression (1), it becomes difficult to sufficiently correct the axial chromatic aberration generated in the reimaging optical system, which is not desirable. When the imaging magnification βc of the reimaging optical system becomes low and exceeds the upper limit in the condition expression (1), vignetting of marginal rays occurs, which is not desirable. Also, this leads to increase in the size of the interchangeable lens to avoid vignetting of the marginal rays, which is not desirable.

The condition expression (2) is a condition expression that defines the ratio between the distance Objc on the optical axis from the lens surface nearest to the object side in the reimaging optical system to the primary image, and the distance Tdc on the optical axis from the lens surface nearest to the object side in the reimaging optical system to the secondary image. When the ratio exceeds the lower limit of the condition expression (2), and the primary image is located at a position apart from the lens surface nearest to the object side in the reimaging optical system to the object side, the entire length of the converter device increases, which is not desirable. When the ratio exceeds the upper limit of the condition expression (2), and the primary image is located at a position apart from the lens surface nearest to the object side in the reimaging optical system to the image side, the refractive power of the reimaging optical system becomes too strong and axial chromatic aberration occurs much, which is not desirable.

As described above, elements are appropriately set to satisfy the condition expressions (1) and (2) in each exemplary embodiment. This makes it possible to provide the converter device that can be used also for the interchangeable lens having a short back focus, and that has high optical performance.

In each exemplary embodiment, it is desirable that the numerical ranges of the condition expressions (1) and (2) be set as described below.

$$-4.00 < \beta c < -0.75 \quad (1a)$$

$$-0.10 < Objc/Tdc < 0.40 \quad (2a)$$

It is more desirable that the numerical ranges of the condition expressions (1) and (2) be set as described below.

$$-3.00 < \beta c < -0.85 \quad (1b)$$

$$-0.08 < Objc/Tdc < 0.30 \quad (2b)$$

It is further more desirable that one or more of the following condition expressions be satisfied in each exemplary embodiment.

$$-5° < \alpha' < 20° \quad (3)$$

$$-30° < \alpha'' < 0° \quad (4)$$

$$-30° < \alpha' + \alpha'' < 10° \quad (5)$$

Herein, the angle between the optical axis and the principal ray of the most off axis passing through the surface nearest to the object side in the reimaging optical system to form the image of the maximum image height on a positive side is represented as α', and the angle between the optical axis and the principal ray of the most off axis passing through the surface nearest to the image side in the reimaging optical system to form the image of the maximum image height on the positive side is represented as α".

As illustrated in FIGS. 7A and 7B, the positive side denotes the area on the upper side than the optical axis of the reimaging optical system when the ray incident in the reimaging optical system is imaged on the imaging plane in a case where the subject is arranged on the left side of the imaging optical system and the image plane exists on the right side of the reimaging optical system. In this case, the angle of the principal ray inclined in the clockwise direction with respect to the optical axis is represented with a positive sign, and the angle of the principal ray inclined in the counterclockwise direction with respect to the optical axis is represented with a negative sign. When description is made with reference to FIG. 7A as an example, the ray indicated by the arrow A corresponds to the principal ray of the most off axis passing through the surface nearest to the object side in the reimaging optical system to form the image of the maximum image height on the positive side. Further, the ray indicated by the arrow B corresponds to the principal ray of the most off axis passing through the surface nearest to the image side in the reimaging optical system to form the image of the maximum image height on the positive side. In the case of FIG. 7A, the angle α' is represented with the positive sign, and angle α" is represented with the negative sign.

The converter device according to an exemplary embodiment of the present invention needs to reverse the light flux having passed through the primary imaging plane PIP to reimage the reversed light flux on the secondary imaging plane, so that the entire length of the reimaging optical system is likely to increase. To shorten the entire length of the reimaging optical system, it is important to cause the primary imaging plane PIP to come close to the secondary imaging plane.

The condition expression (3) is a condition expression defining the angle α' between the optical axis and the principal ray of the most off axis passing through the surface nearest to the object side in the reimaging optical system to form the image of the maximum image height on the positive side. To secure sufficient marginal illumination of the synthesis system of the interchangeable lens and the reimaging optical system, it is necessary to match pupils of respective optical systems to each other. In other words, it is desirable to increase the range where the range of the angle of the light flux incident from the object side in the reimaging optical system and the range of the angle of the light flux emitted to the image side from the interchangeable lens are overlapped. The condition expression (3) is an expression that sets the incident angle of the principal ray to increase the overlapped range of both angles. When the incident angle exceeds the upper limit or the lower limit of the condition expression (3), the marginal area of the image becomes dark, which is not desirable.

The condition expression (4) is a condition expression defining the angle α″ between the optical axis and the principal ray of the most off axis passing through the surface nearest to the image side in the reimaging optical system to form the image of the maximum image height on the positive side. the reimaging optical system needs to reverse the primary image to image the reversed primary image as the secondary image. Herein, by making the angle of the light flux to be emitted on the image side be large as much as possible, downsizing of the reimaging optical system and improvement of performance of the reimaging optical system can be achieved at the same time. On the other hand, when the incident angle of the ray to the image capturing element is too large, shading and coloring occur in the marginal area of the image.

When the angle α″ exceeds the lower limit of the condition expression (4) and becomes too large, shading and coloring occur, which is not desirable. When the angle α″ exceeds the upper limit of the condition expression (4) and become too small, the entire length of the converter device increases, which is not desirable.

The condition expression (5) is a condition expression that defines the angle α′ and the angle α″. When the sum of the angle α′ and the angle α″ exceeds the upper limit or the lower limit of the condition expression (5), it becomes difficult to suppress shading and the like while securing sufficient marginal illumination of the synthesis system of the interchangeable lens and the converter device, and downsizing the converter device, which is not desirable.

It is desirable that the numerical ranges of the condition expressions (3) to (5) be set as described below.

$$0°<\alpha'<15° \quad (3a)$$

$$-27°<\alpha''<-10° \quad (4a)$$

$$-25°<\alpha'+\alpha''<5° \quad (5a)$$

It is more desirable that the numerical ranges of the condition expressions (3) to (5) be set as described below.

$$2°<\alpha'<12° \quad (3b)$$

$$-25°<\alpha''<-12° \quad (4b)$$

$$-22°<\alpha'+\alpha''<2° \quad (5b)$$

Furthermore, when the converter device according to an exemplary embodiment of the present invention is applied to an image capturing apparatus having an imaging plane for the secondary image formed by the reimaging optical system, it is desirable that the following condition expression be satisfied.

$$0.20<Ear/2H\text{max}<0.95 \quad (6)$$

Herein, the maximum image height in the state where the interchangeable lens is attached via the converter device is represented as Hmax, and the effective diameter of the lens surface nearest to the image side of the converter device is represented as Ear.

When the effective diameter Ear of the lens surface nearest to the image side of the converter device becomes small with respect to the maximum image height and exceeds the lower limit of the condition expression (6), the incident angle to the image plane of an off-axis ray becomes large, so that shading and coloring are liable to occur, which is not desirable. When the effective diameter Ear of the lens surface nearest to the image side of the converter device becomes large with respect to the maximum image height and exceeds the upper limit of the condition expression (6), the diameter of the converter device increases in size, which is not desirable.

It is desirable that the numerical range of the condition expression (6) be set as described below.

$$0.25<Ear/2H\text{max}<0.80 \quad (6a)$$

It is more desirable that the numerical range of the condition expression (6) be set as described below.

$$0.30<Ear/2H\text{max}<0.70 \quad (6b)$$

When the converter device according to an exemplary embodiment of the present invention is attached to an image capturing apparatus, a subject image is reversed as compared with the case where no converter device is attached. Thus, it is desirable that the reversed image formed by reversing the image formed by the reimaging optical system be displayed on a display unit in an image capturing apparatus that has the display unit including a liquid crystal display and the like for displaying a captured image and an electronic view finder including an eyepiece lens for observing the image displayed on the display unit. with this configuration, an erected image can be observed through the electronic view finder even when the converter device according to an exemplary embodiment of the present invention is attached to the image capturing apparatus.

Next, configurations of converter devices according to exemplary embodiments of the present invention will be described. In a reimaging optical system included in a converter device according to a first exemplary embodiment, the lens surface nearest to the object side in the reimaging optical system exists at a position separated by 15 mm to the object side from the imaging plane of the primary image formed by the imaging optical system. The reimaging optical system of the first exemplary embodiment is an optical system with an imaging magnification of −1.40 times and an F-number of 4.00.

In a reimaging optical system included in a converter device according to a second exemplary embodiment, the lens surface nearest to the object side in the reimaging optical system exists at a position separated by 30 mm to the object side from the imaging plane of the primary image formed by the imaging optical system. The reimaging optical system of the second exemplary embodiment is an optical system with an imaging magnification of −2.00 times and an F-number of 5.66.

In a reimaging optical system included in a converter device according to a third exemplary embodiment, the lens surface nearest to the object side in the reimaging optical system exists at a position separated by 38 mm to the object side from the imaging plane of the primary image formed by the imaging optical system. The reimaging optical system of the third exemplary embodiment is an optical system with an imaging magnification of −1.00 times and an F-number of 2.80. The converter device according to the third exemplary embodiment has an imaging magnification of −1.00 times, and has no function to extend the focal length of the interchangeable lens. However, the converter device according to the third exemplary embodiment has an image stabilization lens unit IS as illustrated in FIG. 17 and is capable of performing an image shake correction. By moving the image stabilization lens unit IS in the direction having a component of a vertical direction to the optical axis, an image shake correction function can be added. Further, the converter device may be configured to perform wobbling motion in autofocus of a contrast system (contrast autofocus (AF)) by finely driving the image stabilization lens unit IS in the optical axis direction. The wobbling motion is a motion performed to determine in which direction of the infinity side and the closer side the focusing position exists in the contrast AF.

In a reimaging optical system included in a converter device according to a fourth exemplary embodiment, the lens surface nearest to the object side of the reimaging optical system exists at a position separated by mm to the image side from the imaging plane of the primary image formed by the imaging optical system. The reimaging optical system of the fourth exemplary embodiment is an optical system with an imaging magnification of −1.40 times and an F-number of 4.00.

Next, lens data of the optical systems included in the converter devices according to the first to fourth exemplary embodiments of the present invention, and lens data of the imaging optical system of each of the interchangeable lenses A and B to which the converter device according to an exemplary embodiment of the present invention is attached will be illustrated. In each lens data, i denotes an order of the optical surface from the object side. Thus, ri denotes a curvature radius of an optical surface of i-th (i-th surface), di denotes a distance between an i-th surface and an i+1-th surface, and ndi and vdi denotes a refractive index and an Abbe number of the material of the optical member A of i-th with respect to a d line, respectively.

Further, given that K denotes an eccentricity, A4, A6, A8, A10, A12, A14, and A16 denote aspheric coefficients, and a displacement in the optical axis direction at the position of the height h from the optical axis is denoted by x based on a surface vertex, an aspheric shape is expressed as follows: $x=(h^2/r)/[1+[1-(1+K)(h/r)^2]^{1/2}]+A4h^4+A6h^6+A8h^8+A10h^{10}+A12h^{12}+A14h^{14}+A16h^{16}$. In this regard, r is a paraxial curvature radius. Furthermore, the expression of "e-Z" denotes "$10^{-z}$".

In each exemplary embodiment, back focus (BF) indicates, by an air-converted length, a distance from the surface nearest to the image side to the image plane in the imaging optical system or the optical system included in the converter device. Correspondences of the above condition expressions in each numerical exemplary embodiment will be illustrated in Table 1.

[Interchangeable Lens A]

Unit mm

Surface Data

| Surface Number | r | d | nd | vd | Effective Diameter (ea) |
|---|---|---|---|---|---|
| 1 | 204.560 | 2.10 | 1.84666 | 23.9 | 68.66 |
| 2 | 72.156 | 7.40 | 1.77250 | 49.6 | 64.50 |

-continued

Unit mm

| | | | | | |
|---|---|---|---|---|---|
| 3 | 333.009 | 0.15 | | | 63.84 |
| 4 | 56.551 | 6.70 | 1.77250 | 49.6 | 59.01 |
| 5 | 147.768 | (Variable) | | | 57.87 |
| 6* | 107.703 | 1.60 | 1.88300 | 40.8 | 33.53 |
| 7 | 16.578 | 7.87 | | | 24.69 |
| 8 | −46.474 | 1.15 | 1.59522 | 67.7 | 23.67 |
| 9 | 21.417 | 4.45 | 1.88300 | 40.8 | 21.26 |
| 10 | 67.901 | 1.27 | | | 19.98 |
| 11 | 129.834 | 3.48 | 1.59270 | 35.3 | 20.65 |
| 12 | −49.739 | 1.61 | | | 21.37 |
| 13 | −23.347 | 1.15 | 1.72916 | 54.7 | 21.43 |
| 14 | 404.189 | 2.69 | 1.84666 | 23.9 | 23.86 |
| 15 | −57.801 | (Variable) | | | 24.55 |
| 16 | ∞ | 1.90 | | | (Variable) |
| 17(Stop) | ∞ | 0.00 | | | 26.94 |
| 18 | 27.563 | 1.45 | 1.88300 | 40.8 | 30.03 |
| 19 | 21.253 | 11.00 | 1.49700 | 81.5 | 29.21 |
| 20 | −64.876 | 0.20 | | | 29.58 |
| 21 | 43.054 | 2.70 | 1.58313 | 59.4 | 29.26 |
| 22* | 63.670 | 4.61 | | | 28.62 |
| 23 | −44.565 | 1.40 | 1.72047 | 34.7 | 28.59 |
| 24 | −153.891 | (Variable) | | | 29.25 |
| 25 | 31.112 | 7.13 | 1.43875 | 94.9 | 30.54 |
| 26 | −203.991 | 0.20 | | | 30.08 |
| 27 | 47.466 | 5.85 | 1.49700 | 81.5 | 30.47 |
| 28 | −71.666 | 1.96 | | | 30.22 |
| 29* | −205.992 | 2.10 | 1.85006 | 40.2 | 28.71 |
| 30* | 88.343 | 2.63 | | | 27.92 |
| 31 | −442.074 | 1.40 | 1.83400 | 37.2 | 28.02 |
| 32 | 61.478 | 5.17 | 1.51633 | 64.1 | 28.80 |
| 33 | −61.478 | | | | 29.46 |

Aspheric Surface Data

6th Surface

K = 0.00000e+000 A 4 = 7.12736e−006 A6 = −9.11631e−009
A8 = 2.35269e−011 A10 = −5.05824e−014 A12 = 7.73415e−017

22nd Surface

K = 0.00000e+000 A4 = 5.39187e−006 A6 = 5.52428e−009
A8 = −8.87533e−012 A10 = 1.15050e−013 A12 = −9.43064e−017

29th Surface

K = 0.00000e+000 A4 = 2.73309e−005 A6 = −1.56548e−007
A8 = 3.98764e−010 A10 = −7.46700e−013 A12 = 6.95925e−016

30th Surface

K = 0.00000e+000 A4 = 4.43162e−005 A6 = −1.34466e−007
A8 = 3.25418e−010 A10 = −4.48417e−013 A12 = 2.53228e−016

Various Data
Zoom Ratio 2.75

| | Wide-Angle | Intermediate | Telephoto |
|---|---|---|---|
| Focal Length | 24.70 | 34.91 | 67.88 |
| F-number | 2.91 | 2.91 | 2.91 |
| Half Angle of View | 41.22 | 31.79 | 17.68 |
| Image Height | 21.64 | 21.64 | 21.64 |
| Total Lens Length | 154.68 | 162.21 | 186.04 |
| BF | 38.09 | 46.60 | 63.40 |
| d5 | 2.75 | 11.74 | 30.36 |
| d15 | 13.71 | 7.72 | 0.23 |
| d24 | 8.82 | 4.84 | 0.74 |
| ea16 | 18.54 | 20.67 | 25.63 |

Lens Unit Data

| Unit | Starting Surface | Focal Length | Lens Structure Length | Front-Side Principal Point Position | Rear-Side Principal Point Position |
|---|---|---|---|---|---|
| 1 | 1 | 106.37 | 16.35 | 1.50 | −7.63 |
| 2 | 6 | −16.39 | 25.26 | 2.87 | −15.39 |

-continued

Unit mm

| 3 | 18 | 57.88 | 23.26 | −3.01 | −18.40 |
| 4 | 25 | 46.04 | 26.44 | 1.17 | −18.24 |

[Interchangeable Lens B]

Unit mm

Surface Data

| Surface Number | r | d | nd | vd | Effective Diameter (ea) |
|---|---|---|---|---|---|
| 1* | ∞ | 2.80 | 1.76385 | 48.5 | 55.22 |
| 2* | 19.710 | 10.06 | | | 41.37 |
| 3* | ∞ | 2.50 | 1.85135 | 40.1 | 39.75 |
| 4* | 88.425 | 8.02 | | | 33.18 |
| 5 | −36.469 | 1.40 | 1.59282 | 68.6 | 32.90 |
| 6 | 175.507 | 0.15 | | | 34.08 |
| 7 | 72.176 | 5.58 | 1.90366 | 31.3 | 34.70 |
| 8 | −95.327 | (Variable) | | | 34.66 |
| 9 | ∞ | 1.41 | | | (Variable) |
| 10 | 99.317 | 2.66 | 1.80610 | 33.3 | 28.75 |
| 11 | −213.620 | 0.15 | | | 28.93 |
| 12 | 51.098 | 1.25 | 1.84666 | 23.8 | 29.43 |
| 13 | 23.542 | 6.87 | 1.57501 | 41.5 | 28.71 |
| 14 | 261.531 | (Variable) | | | 28.83 |
| 15 | 61.498 | 1.25 | 1.84666 | 23.8 | 29.48 |
| 16 | 38.482 | 7.24 | 1.51633 | 64.1 | 29.13 |
| 17 | −53.624 | (Variable) | | | 29.12 |
| 18(Stop) | ∞ | 2.97 | | | 24.82 |
| 19 | −55.358 | 1.00 | 1.91082 | 35.3 | 24.32 |
| 20 | 86.924 | 1.04 | | | 24.50 |
| 21 | 42.754 | 6.56 | 1.80809 | 22.8 | 25.29 |
| 22 | −32.152 | 1.10 | 1.91082 | 35.3 | 25.13 |
| 23 | 91.214 | 3.03 | | | 25.01 |
| 24 | ∞ | (Variable) | | | (Variable) |
| 25 | 34.148 | 10.35 | 1.49700 | 81.5 | 25.89 |
| 26 | −20.776 | 1.20 | 1.83481 | 42.7 | 25.53 |
| 27 | −28.692 | 0.15 | | | 26.62 |
| 28* | 116.832 | 1.00 | 1.90366 | 31.3 | 26.70 |
| 29 | 26.396 | 6.61 | 1.49700 | 81.5 | 26.70 |
| 30 | −130.257 | (Variable) | | | 27.47 |
| 31 | ∞ | | | | 30.50 |

Aspheric Surface Data

1st Surface

K = 0.00000e+000 A4 = 1.16240e−005 A6 = −1.43464e−008
A8 = 1.53911e−011
A10 = −1.16093e−014 A12 = 2.35255e−017 A14 = −3.41512e−020
A16 = 1.86334e−023
2nd Surface K = −1.28966e+000 A4 = −3.76697e−006 A6 = 4.56307e−010
A8 = 2.74463e−011
A10 = −7.02319e−013 A12 = 1.59446e−015 A14 = 6.04845e−020
A16 = −1.73466e−021
3rd Surface K = 0.00000e+000 A4 = −3.64999e−005 A6 = 1.12188e−007
A8 = −1.13740e−010
A10 = 2.82141e−014 A12 = 2.48495e−016 A14 = −1.09572e−018
A16 = 1.18199e−021
4th Surface K = 8.77138e+000 A4 = −1.55214e−005 A6 = 1.36095e−007
A8 = −5.52082e−011
A10 = 4.85385e−014 A12 = 3.55622e−016 A14 = 2.96869e−018
A16 = −1.20548e−020
28th Surface K = 0.00000e+000 A4 = −9.11671e−006 A6 = 1.48788e−008
A8 = −3.28894e−010

-continued

Unit mm

A10 = 2.34614e−012 A12 = −8.13846e−015 A14 = 6.92483e−018
A16 = 1.77415e−020

| | Wide-Angle | Intermediate | Telephoto |
|---|---|---|---|
| Focal Length | 16.48 | 24.01 | 33.95 |
| F-number | 2.91 | 2.91 | 2.91 |
| Half Angle of View | 52.70 | 42.02 | 32.51 |
| Image Height | 21.64 | 21.64 | 21.64 |
| Total Lens Length | 169.81 | 164.72 | 166.09 |
| BF | 38.20 | 38.20 | 38.20 |
| d8 | 28.49 | 11.23 | 0.84 |
| d14 | 4.84 | 9.40 | 4.91 |
| d17 | 2.20 | 7.34 | 11.77 |
| d24 | 9.71 | 2.38 | −0.42 |
| d30 | 0.01 | 9.81 | 24.43 |
| ea9 | 23.11 | 25.85 | 27.85 |
| ea24 | 16.39 | 19.77 | 25.46 |

Lens Unit data

| Unit | Starting Surface | Focal Length | Lens Structure Length | Front-Side Principal Point Position | Rear-Side Principal Point Position |
|---|---|---|---|---|---|
| 1 | 1 | −22.34 | 30.51 | 1.56 | −25.50 |
| 2 | 10 | 66.39 | 12.34 | 0.85 | −7.11 |
| 3 | 15 | 68.68 | 8.49 | 3.22 | −2.37 |
| 4 | 19 | −46.49 | 15.71 | 5.24 | −6.29 |
| 5 | 25 | 44.41 | 19.31 | 4.04 | −9.23 |

Numerical Example 1

Unit mm

Surface Data

| Surface Number | r | d | nd | vd | Effective Diameter (ea) |
|---|---|---|---|---|---|
| 1 | 25.000 | 10.19 | 1.89286 | 20.4 | 31.47 |
| 2 | −39.769 | 1.50 | 1.65412 | 39.7 | 30.26 |
| 3 | 16.159 | 15.08 | | | 21.18 |
| 4 | 50.636 | 3.34 | 1.89286 | 20.4 | 19.94 |
| 5 | −39.337 | 1.00 | 1.51633 | 64.1 | 19.69 |
| 6 | 13.689 | 12.71 | | | 17.35 |
| 7 | 34.398 | 1.00 | 1.61340 | 44.3 | 18.95 |
| 8 | 11.910 | 7.65 | 1.59522 | 67.7 | 18.43 |
| 9 | −20.318 | 0.15 | | | 18.32 |
| 10 | −24.874 | 2.11 | 1.59522 | 67.7 | 17.63 |
| 11 | −15.710 | 1.00 | 1.76182 | 26.5 | 17.40 |
| 12 | 278.545 | 8.02 | | | 17.16 |
| 13 | 87.894 | 3.21 | 1.89286 | 20.4 | 20.85 |
| 14 | −37.672 | 0.15 | | | 21.00 |
| 15 | 18.945 | 3.38 | 1.95375 | 32.3 | 19.79 |
| 16 | 59.982 | 0.15 | | | 18.83 |
| 17 | 17.414 | 3.47 | 1.59522 | 67.7 | 16.97 |
| 18 | −188.078 | 1.00 | 1.85478 | 24.8 | 15.71 |
| 19 | 11.439 | 2.44 | | | 12.82 |
| 20 | −44.111 | 1.00 | 1.85478 | 24.8 | 12.82 |
| 21 | 15.174 | 2.09 | 1.59522 | 67.7 | 12.45 |
| 22 | 57.905 | 0.15 | | | 12.67 |
| 23 | 27.190 | 6.20 | 1.76385 | 48.5 | 12.93 |
| 24* | 679.730 | | | | 13.92 |

Aspheric Surface Data
24th Surface

K = 0.00000e+000 A4 = 4.18517e−005 A6 = 3.55274e−008
A8 = 2.72733e−010 A10 = −2.10007e−012

| Focal Length | 34.58 |
| F-number | 4.00 |

-continued

Unit mm

| | |
|---|---|
| Image Height | 21.64 |
| Total Lens Length | 132.02 |
| Object Surface | 15.00 |
| BF | 45.02 |
| β | −1.40 |

Optical Data

| Focal Length | Lens Structure Length | Front-Side Principal Point Position | Rear-Side Principal Point Position |
|---|---|---|---|
| 34.58 | 87.00 | 74.29 | −37.98 |

Numerical Example 2

Unit mm

Surface Data

| Surface Number | r | d | nd | vd | Effective Diameter (ea) |
|---|---|---|---|---|---|
| 1 | 189.174 | 1.30 | 1.51633 | 64.1 | 24.00 |
| 2 | 49.264 | 7.25 | | | 23.64 |
| 3 | 15.000 | 7.53 | 1.76385 | 48.5 | 24.96 |
| 4 | 38.922 | 7.74 | | | 22.40 |
| 5 | 84.173 | 1.00 | 1.51633 | 64.1 | 13.40 |
| 6 | 10.856 | 15.23 | | | 11.56 |
| 7 | −136.064 | 1.10 | 1.85478 | 24.8 | 14.42 |
| 8 | 13.383 | 5.82 | 1.76385 | 48.5 | 15.01 |
| 9 | −18.282 | 0.15 | | | 15.46 |
| 10 | 11.249 | 3.94 | 1.89286 | 20.4 | 14.36 |
| 11 | 85.062 | 1.80 | | | 13.04 |
| 12 | 27.277 | 0.53 | 1.85478 | 24.8 | 9.82 |
| 13 | 6.873 | 0.21 | | | 8.60 |
| 14 | 7.821 | 4.73 | 1.76385 | 48.5 | 8.60 |
| 15 | −5.753 | 1.10 | 1.78472 | 25.7 | 7.61 |
| 16 | 17.891 | 1.27 | | | 6.46 |
| 17 | −8.171 | 1.00 | 1.80518 | 25.4 | 6.37 |
| 18 | 10.758 | 3.83 | 1.76385 | 48.5 | 8.01 |
| 19 | −23.760 | 0.50 | | | 10.20 |
| 20 | 28.844 | 3.37 | 1.89286 | 20.4 | 12.40 |
| 21 | −19.640 | 1.10 | 1.85478 | 24.8 | 12.93 |
| 22* | −110.866 | | | | 13.64 |

Aspheric Surface Data
22nd Surface

K = 0.00000e+000 A4 = 9.74082e−005 A6 = −7.82151e−008
A8 = 1.00903e−009 A10 = −8.64313e−012

| | |
|---|---|
| Focal Length | 22.89 |
| F-number | 5.66 |
| Image Height | 21.64 |
| Total Lens Length | 110.00 |
| Object Surface | 30.00 |
| BF | 39.54 |
| β | −2.00 |

Optical Data

| Focal Length | Lens Structure Length | Front-Side Principal Point Position | Rear-Side Principal Point Position |
|---|---|---|---|
| 22.89 | 70.50 | 64.34 | −29.13 |

Numerical Example 3

Unit mm

Surface Data

| Surface Number | r | d | nd | vd | Effective Diameter (ea) |
|---|---|---|---|---|---|
| 1 | 27.832 | 4.45 | 1.48749 | 70.2 | 37.28 |
| 2 | 37.509 | 6.32 | | | 36.39 |
| 3 | 21.000 | 8.82 | 1.89286 | 20.4 | 34.85 |
| 4 | 44.223 | 2.25 | | | 31.79 |
| 5 | 38.406 | 9.78 | 1.59522 | 67.7 | 28.31 |
| 6 | −22.000 | 1.30 | 1.61340 | 44.3 | 23.36 |
| 7 | 11.193 | 13.71 | | | 15.35 |
| 8 | −11.135 | 1.10 | 1.80000 | 29.8 | 16.40 |
| 9 | 87.814 | 7.41 | 1.76385 | 48.5 | 22.04 |
| 10 | −17.419 | 0.15 | | | 24.15 |
| 11 | −309.142 | 5.82 | 1.59522 | 67.7 | 27.31 |
| 12 | −23.942 | 0.15 | | | 28.02 |
| 13 | 30.948 | 4.76 | 1.89286 | 20.4 | 27.81 |
| 14 | 667.437 | 6.32 | | | 27.07 |
| 15 | 24.408 | 6.13 | 1.59522 | 67.7 | 21.48 |
| 16 | −31.174 | 1.10 | 1.68893 | 31.1 | 19.98 |
| 17 | 21.401 | 3.33 | | | 17.03 |
| 18 | −33.943 | 1.00 | 1.85478 | 24.8 | 16.77 |
| 19 | 14.786 | 5.95 | 1.59522 | 67.7 | 16.65 |
| 20 | −42.452 | 0.50 | | | 17.23 |
| 21 | 28.919 | 5.29 | 1.76385 | 48.5 | 19.02 |
| 22 | −23.588 | 0.15 | | | 19.37 |
| 23 | −25.277 | 1.10 | 1.85478 | 24.8 | 19.26 |
| 24* | 103.742 | 6.06 | | | 20.04 |
| 25 | 81.212 | 2.25 | 1.89286 | 20.4 | 24.49 |
| 26 | 276.579 | | | | 24.81 |

Aspheric Surface Data
24th Surface

K = 0.00000e+000 A4 = 1.43253e−005 A6 = −1.27277e−008
A8 = −5.58122e−012 A10 = 1.99962e−013

| | |
|---|---|
| Focal Length | 80.63 |
| F-number | 2.80 |
| Image Height | 21.64 |
| Total Lens Length | 145.00 |
| Object Surface | 38.00 |
| BF | 39.86 |
| β | −1.00 |

Optical Data

| Focal Length | Lens Structure Length | Front-Side Principal Point Position | Rear-Side Principal Point Position |
|---|---|---|---|
| 80.63 | 105.22 | 199.27 | −121.41 |

Numerical Example 4

Unit mm

Surface Data

| Surface Number | r | d | nd | vd | Effective Diameter (ea) |
|---|---|---|---|---|---|
| 1 | 97.965 | 9.53 | 1.84666 | 23.8 | 33.28 |
| 2 | −25.775 | 2.30 | 1.48749 | 70.2 | 33.32 |
| 3 | 24.990 | 5.86 | 2.00069 | 25.5 | 27.86 |
| 4 | 231.068 | 2.00 | | | 26.57 |
| 5 | 33.900 | 0.85 | 1.68893 | 31.1 | 21.98 |
| 6 | 14.723 | 12.57 | | | 19.26 |
| 7 | −13.674 | 1.30 | 1.85478 | 24.8 | 14.83 |

-continued

Unit mm

| | | | | | |
|---|---|---|---|---|---|
| 8 | 21.230 | 5.47 | 1.59522 | 67.7 | 16.28 |
| 9 | −21.113 | 0.15 | | | 17.26 |
| 10 | 38.316 | 4.79 | 1.76385 | 48.5 | 18.08 |
| 11 | −24.684 | 0.15 | | | 18.06 |
| 12 | 23.196 | 3.55 | 1.76385 | 48.5 | 15.97 |
| 13 | −211.118 | 0.53 | | | 14.96 |
| 14 | −42.515 | 1.00 | 1.85478 | 24.8 | 14.95 |
| 15 | 20.504 | 2.27 | | | 14.33 |
| 16(Stop) | ∞ | 2.94 | | | 14.58 |
| 17 | −27.272 | 1.10 | 1.68893 | 31.1 | 15.78 |
| 18 | 38.004 | 4.70 | 1.89286 | 20.4 | 18.48 |
| 19 | −32.146 | 3.74 | | | 19.81 |
| 20 | 40.253 | 5.25 | 1.76385 | 48.5 | 24.79 |
| 21 | −60.602 | 13.46 | | | 24.92 |
| 22 | −23.792 | 2.00 | 1.85478 | 24.8 | 22.49 |
| 23* | −58.683 | | | | 23.94 |

Aspheric Surface Data
23rd surface

K = 0.00000e+000 A4 = 1.40449e−005 A6 = −7.92283e−009
A8 = 3.21246e−011 A10 = −1.63685e−013

| | |
|---|---|
| Focal Length | 34.70 |
| F-number | 4.00 |
| Image Height | 21.64 |
| Total Lens Length | 124.00 |
| Object Surface | −6.00 |
| BF | 38.50 |
| β | −1.40 |

Optical Data

| Focal Length | Lens Structure Length | Front-Side Principal Point Position | Rear-Side Principal Point Position |
|---|---|---|---|
| 34.70 | 85.53 | 53.49 | −44.79 |

TABLE 1

| | First Exemplary Embodiment | Second Exemplary Embodiment | Third Exemplary Embodiment | Fourth Exemplary Embodiment |
|---|---|---|---|---|
| FNO | 4.00 | 5.66 | 2.80 | 4.00 |
| Tdc | 132.02 | 110.00 | 145.00 | 124.00 |
| Objc | 15.00 | 30.00 | 38.00 | −6.00 |
| Ear | 13.92 | 13.64 | 24.81 | 23.94 |
| Hmax | 21.64 | 21.64 | 21.64 | 21.64 |
| (1) βc | −1.40 | −2.00 | −1.00 | −1.40 |
| (2) Objc/Tdc | 0.11 | 0.27 | 0.26 | −0.05 |
| (3) α' | 3.03 | 3.00 | 9.97 | 2.31 |
| (4) α" | −21.87 | −23.59 | −18.19 | −19.63 |
| (5) α' + α" | −18.84 | −20.59 | −8.22 | −17.32 |
| (6) Ear/2Hmax | 0.32 | 0.32 | 0.57 | 0.55 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-234311, filed Nov. 30, 2015, which is hereby incorporated by reference herein in its entirety.

What is claimed is:

1. A converter device to be attached between a lens device, which is attachable to and detachable from an image capturing apparatus, and the image capturing apparatus, the converter device comprising a reimaging optical system configured to reimage a primary image formed by the lens device on an image plane as a secondary image, wherein, given that an imaging magnification of the reimaging optical system is represented as $\beta c$, a distance on an optical axis from a first surface which is an object-side surface of a lens nearest to an object-side of the reimaging optical system to the primary image is represented as Objc, and a distance on the optical axis from the first surface to the secondary image is represented as Tdc, the following condition expressions are satisfied:

$-5.00 < \beta c < -0.85$; and $-0.20 < Objc/Tdc < 0.50$.

2. The converter device according to claim 1, wherein, given that an angle between the optical axis in the reimaging optical system and a principal ray of an off-axis light passing through which is an object-side surface of a lens nearest to an object-side of the reimaging optical system an image of a maximum image height on a positive side is represented as $\alpha'$, and given that an angle of the principal ray inclined in a clockwise direction with respect to the optical axis is represented with a positive sign, and an angle of the principal ray inclined in a counterclockwise direction with respect to the optical axis is represented with a negative sign, the following condition expression is satisfied:

$-5° < \alpha' < 20°$.

3. The converter device according to claim 1, wherein, given that an angle between the optical axis in the reimaging optical system and a principal ray of an off-axis light passing through a second surface which is an image-side surface of a lens nearest to an image-side of the reimaging optical system and forming an image of a maximum image height on a positive side is represented as $\alpha"$, and given that an angle of the principal ray inclined in a clockwise direction with respect to the optical axis is represented with a positive sign, and an angle of the principal ray inclined in a counterclockwise direction with respect to the optical axis is represented with a negative sign, the following condition expression is satisfied:

$-30° < \alpha" < 0°$.

4. The converter device according to claim 1, wherein, given that an angle between the optical axis in the reimaging optical system and a principal ray of an off-axis light passing through the first surface and forming an image of a maximum image height on a positive side is represented as $\alpha'$, and an angle between the optical axis in the reimaging optical system and a principal ray of an off-axis light passing through a second surface which is an image-side surface of a lens nearest to an image-side of the reimaging optical system and forming an image of a maximum image height on the positive side is represented as $\alpha"$, and given that an angle of the principal ray inclined in a clockwise direction with respect to the optical axis is represented with a positive sign, and an angle of the principal ray inclined in a counterclockwise direction with respect to the optical axis is represented with a negative sign, the following condition expression is satisfied:

$-30° < \alpha' + \alpha" < 10°$.

5. An image capturing apparatus to and from which a lens device is attachable and detachable via a converter device, the image capturing apparatus comprising an image capturing element configured to receive an image formed by the lens device and the converter device, wherein, the image received by the image capturing element is an image formed by reimaging a primary image, which is formed by the lens device, by a reimaging optical system included in the converter device as a secondary image, and wherein, given that an imaging magnification of the reimaging optical system is represented as βc, a distance on an optical axis from a first surface which is an object-side surface of a lens nearest to an object-side of the reimaging optical system to the primary image is represented as Objc, and a distance on the optical axis from the first surface to the secondary image is represented as Tdc, the following condition expressions are satisfied:

−5.00<βc<−0.85; and

−0.20<*Objc*/*Tdc*<0.50.

6. The image capturing apparatus according to claim 5, wherein, given that a maximum image height in a state where the lens device is attached to the image capturing apparatus via the converter device is represented as Hmax, and an effective diameter of a second surface which is an object-side surface of a lens nearest to an object-side of the reimaging optical system is represented as Ear, the following condition expression is satisfied:

0.20<*Ear*/2*H*max<0.95.

7. The image capturing apparatus according to claim 5, wherein the image capturing apparatus is capable of performing an imaging operation also when the lens device is attached to the image capturing apparatus with no intermediation of the converter device.

8. An image capturing apparatus to and from which a lens device is attachable and detachable via a converter device, the image capturing apparatus comprising an image capturing element configured to receive an image formed by the lens device and the converter device, wherein, the image received by the image capturing element is an image formed by reimaging a primary image, which is formed by the lens device, by a reimaging optical system included in the converter device as a secondary image, and wherein, given that an imaging magnification of the reimaging optical system is represented as βc, a maximum image height in a state where an interchangeable lens is attached to the image capturing apparatus via the converter device is represented as Hmax, and an effective diameter of a second surface which is an image-side surface of a lens nearest to an image-side of the reimaging optical system is represented as Ear, the following condition expressions are satisfied:

−5.00<βc<−0.55; and 0.20<*Ear*/2*H*max<0.95.

9. A converter device to be attached between a lens device, which is attachable to and detachable from an image capturing apparatus, and the image capturing apparatus, the converter device comprising a reimaging optical system configured to reimage a primary image formed by the lens device on an image plane as a secondary image, wherein, given that an imaging magnification of the reimaging optical system is represented as βc, a distance on an optical axis from a first surface which is an object-side surface of a lens nearest to an object-side of the reimaging optical system to the primary image is represented as Objc, and a distance on the optical axis from the first surface to the secondary image is represented as Tdc, and an angle between the optical axis in the reimaging optical system and a principal ray of an off-axis light passing through the first surface and forming an image of a maximum image height on a positive side is represented as α', and given that an angle of the principal ray inclined in a clockwise direction with respect to the optical axis is represented with a positive sign, and an angle of the principal ray inclined in a counterclockwise direction with respect to the optical axis is represented with a negative sign, the following condition expressions are satisfied:

−5.00<βc<−0.55;

−0.20<*Objc*/*Tdc*<0.50; and

−5°<α'<20°.

10. A converter device to be attached between a lens device, which is attachable to and detachable from an image capturing apparatus, and the image capturing apparatus, the converter device comprising a reimaging optical system configured to reimage a primary image formed by the lens device on an image plane as a secondary image, wherein given that an imaging magnification of the reimaging optical system is represented as βc, a distance on an optical axis from a first surface which is an object-side surface of a lens nearest to an object-side of the reimaging optical system to the primary image is represented as Objc, and a distance on the optical axis from the first surface to the secondary image is represented as Tdc, an angle between the optical axis in the reimaging optical system and a principal ray of an off-axis light passing through a second surface which is an image-side surface of a lens nearest to an image-side of the reimaging optical system and forming an image of a maximum image height on a positive side is represented as α", and given that an angle of the principal ray inclined in a clockwise direction with respect to the optical axis is represented with a positive sign, and an angle of the principal ray inclined in a counterclockwise direction with respect to the optical axis is represented with a negative sign, the following condition expressions are satisfied:

−5.00<βc<−0.55;

−0.20<*Objc*/*Tdc*<0.50; and

−30°<α"<0°.

11. A converter device to be attached between a lens device, which is attachable to and detachable from an image capturing apparatus, and the image capturing apparatus, the converter device comprising a reimaging optical system configured to reimage a primary image formed by the lens device on an image plane as a secondary image, wherein, given that an imaging magnification of the reimaging optical system is represented as βc, a distance on an optical axis from a first surface which is an object-side surface of a lens nearest to an object-side of the reimaging optical system to the primary image is represented as Objc, and a distance on the optical axis from the first surface to the secondary image is represented as Tdc, an angle between the optical axis in the reimaging optical system and a principal ray of an off-axis light passing through the first surface and forming an image of a maximum image height on a positive side is represented as α', and an angle between the optical axis in the reimaging optical system and a principal ray of an off-axis light passing through a second surface which is an image-side surface of a lens nearest to an image-side of the reimaging optical system and forming an image of a maximum image height on the positive side is represented as α", and given that an angle of the principal ray inclined in a clockwise direction with respect to the optical axis is represented with a positive sign, and an angle of the principal ray inclined in a counterclockwise direction with respect to the optical axis is represented with a negative sign, the following condition expressions are satisfied:

$-5.00 < \beta c < -0.55;$ $-0.20 < Objc/Tdc < 0.50;$ and $-30° < \alpha' + \alpha'' < 10°.$ 12. An image capturing apparatus to and from which a lens device is attachable and detachable via a converter device, the image capturing apparatus comprising an image capturing element configured to receive an image formed by the lens device and the converter device,
    wherein, the image received by the image capturing element is an image formed by reimaging a primary image, which is formed by the lens device, by a reimaging optical system included in the converter device as a secondary image, and
    wherein, given that an imaging magnification of the reimaging optical system is represented as βc, a distance on an optical axis from a first surface which is an object-side surface of a lens nearest to an object-side of the reimaging optical system to the primary image is represented as Objc, and a distance on the optical axis from the first surface to the secondary image is represented as Tdc, a maximum image height in a state where the lens device is attached to the image capturing apparatus via the converter device is represented as Hmax, and an effective diameter of a second surface which is an image-side surface of a lens nearest to an image-side of the reimaging optical system is represented as Ear, the following condition expressions are satisfied:

$-5.00 < \beta c < -0.55;$ $-0.20 < Objc/Tdc < 0.50;$ and $0.20 < Ear/2Hmax < 0.95.$

* * * * *